United States Patent
Suzuki et al.

(10) Patent No.: US 10,447,451 B2
(45) Date of Patent: Oct. 15, 2019

(54) TERMINAL DEVICE, BASE STATION DEVICE, COMMUNICATION METHOD, AND INTEGRATED CIRCUIT

(71) Applicant: Sharp Kabushiki Kaisha, Sakai, Osaka (JP)

(72) Inventors: Shoichi Suzuki, Sakai (JP); Tatsushi Aiba, Sakai (JP); Kazunari Yokomakura, Sakai (JP); Wataru Ouchi, Sakai (JP); Takashi Hayashi, Sakai (JP); Kimihiko Imamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/773,568

(22) PCT Filed: Oct. 24, 2016

(86) PCT No.: PCT/JP2016/081424
§ 371 (c)(1),
(2) Date: May 4, 2018

(87) PCT Pub. No.: WO2017/082028
PCT Pub. Date: May 18, 2017

(65) Prior Publication Data
US 2018/0323934 A1 Nov. 8, 2018

(30) Foreign Application Priority Data
Nov. 13, 2015 (JP) .................................. 2015-222859

(51) Int. Cl.
*H04L 5/00* (2006.01)
*H04B 7/04* (2017.01)
(Continued)

(52) U.S. Cl.
CPC ............. *H04L 5/0053* (2013.01); *H04B 7/04* (2013.01); *H04B 7/063* (2013.01); *H04B 7/0626* (2013.01);
(Continued)

(58) Field of Classification Search
CPC ......... H04L 5/0053; H04B 17/24; H04B 7/04; H04B 7/0626; H04B 7/063; H04W 8/22; H04W 16/28; H04W 72/04; H04W 72/042
See application file for complete search history.

(56) References Cited

U.S. PATENT DOCUMENTS

| 2013/0182789 A1* | 7/2013 | Ko ........................ H04B 7/0626 375/267 |
| 2015/0215906 A1* | 7/2015 | Park ...................... H04W 72/12 370/312 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 12)", 3GPP TS 36.101 V12.7.0, Mar. 2015, 659 pages.
(Continued)

*Primary Examiner* — Duc C Ho
(74) *Attorney, Agent, or Firm* — Keating & Bennett, LLP

(57) ABSTRACT

A terminal device and a base station device efficiently communicate with each other. For the terminal device, in a case that third information is configured, a third maximum number of the layers assumed for determining a bit width for a first RI and a fourth maximum number of the layers assumed for determining a bit width for a second RI are provided, based on the third information. In case that the third information is not configured, the third maximum number and the fourth maximum number are provided, based on a smallest one of a first number and a second number. The first number is a second maximum number of the layers indicated by second information, and the second number is a largest one of the number of antenna ports of a first CSI-RS resource and the number of antenna ports of a second CSI-RS resource.

4 Claims, 26 Drawing Sheets

(51) Int. Cl.
  *H04W 8/22*   (2009.01)
  *H04W 16/28*  (2009.01)
  *H04W 72/04*  (2009.01)
  *H04B 17/24*  (2015.01)
  *H04B 7/06*   (2006.01)

(52) U.S. Cl.
  CPC .............. *H04B 17/24* (2015.01); *H04W 8/22* (2013.01); *H04W 16/28* (2013.01); *H04W 72/04* (2013.01); *H04W 72/042* (2013.01)

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP TS 36.211 V12.5.0, Mar. 2015, pp. 1-136.

"3rd Generation Partnership Project; Technical Specification Group Radio Access Network; Evolved Universal Terrestrial Radio Access (E-UTRA); Multiplexing and channel coding (Release 12)", 3GPP TS 36.212 V12.4.0, Mar. 2015, pp. 1-94.

"3rd Generation Partnership Project; Technical Specification Group Radio Access Network; Evolved Universal Terrestrial Radio Access (E-UTRA); Physical layer procedures (Release 12)", 3GPP TS 36.213 V12.5.0, Mar. 2015, pp. 1-239.

"LTE; Evolved Universal Terrestrial Radio Access (E-UTRA); User Equipment (UE) radio access capabilities (Release 12)", 3GPP TS 36.306 V12.4.0, Apr. 2015, 43 pages.

* cited by examiner

| Transmission Mode (P800) | DCI format (P801) | Transmission scheme of PDSCH corresponding to PDCCH (the number of supported layers) (P802) |
|---|---|---|
| Mode 4 | DCI format 2 | Closed-loop spatial multiplexing (up to 4 layers) or Transmit diversity (1 layer) |
| Mode 5 | DCI format 1D | Multi-user MIMO (1 layer) |
| Mode 6 | DCI format 1B | Closed-loop spatial multiplexing (1 layer) |
| Mode 8 | DCI format 2B | Dual layer transmission (2 layers) or Single-antenna port (1 layer) |
| Mode 9 | DCI format 2C | Up to 8 layer transmission (up to 8 layers) or Single-antenna port (1 layer) |
| Mode 10 | DCI format 2D | Up to 8 layer transmission (up to 8 layers) or Single-antenna port (1 layer) |

FIG. 8

| UE Radio Access Capability parameter (P900) | UE Category (P901) | Total number of soft channel bits (P902) | Maximum number of supported layers for spatial multiplexing in DL (P903) |
|---|---|---|---|
| ue-Category (without suffix) | Category 1 | 250368 | 1 |
| | Category 2 | 1237248 | 2 |
| | Category 3 | 1237248 | 2 |
| | Category 4 | 1827027 | 2 |
| | Category 5 | 3667200 | 4 |
| ue-Category-v1020 | Category 6 | 3654144 | 2 or 4 |
| | Category 7 | 3654144 | 2 or 4 |
| | Category 8 | 35982720 | 8 |
| ue-Category-v1170 | Category 9 | 5481216 | 2 or 4 |
| | Category 10 | 5481216 | 2 or 4 |
| ue-Category-v11a0 | Category 11 | 7308288 | 2 or 4 |
| | Category 12 | 7308288 | 2 or 4 |

FIG. 9

| UE Radio Access Capability parameter (P1000) | UE DL Category (P1001) | Total number of soft channel bits (P1002) | Maximum number of supported layers for spatial multiplexing in DL (P1003) |
|---|---|---|---|
| *ue-CategoryDL-r12* | DL Category 0 | 25344 | 1 |
| | DL Category 6 | 3654144 | 2 or 4 |
| | DL Category 7 | 3654144 | 2 or 4 |
| | DL Category 9 | 5481216 | 2 or 4 |
| | DL Category 10 | 5481216 | 2 or 4 |
| | DL Category 11 | 7308288 | 2 or 4 |
| | DL Category 12 | 7308288 | 2 or 4 |
| | DL Category 13 | 3654144 | 2 or 4 |
| | DL Category 14 | 47431680 | 8 |

FIG. 10

| Case | ue-CategoryDL-r12 | ue-Category-v1170 | ue-Category-v1170 | ue-Category-v1020 | ue-Category (without suffix) |
|---|---|---|---|---|---|
| Case 1 | | | | Category 6 | Category 4 |
| Case 2 | | | | Category 7 | Category 4 |
| Case 3 | | | | Category 8 | Category 5 |
| Case 4 | | | Category 9 | Category 6 | Category 4 |
| Case 5 | | Category 11 | Category 10 | Category 7 | Category 4 |
| Case 6 | | Category 11 | Category 9 | Category 6 | Category 4 |
| Case 7 | | Category 12 | Category 10 | Category 7 | Category 4 |
| Case 8 | DL Category 0 | | | | |
| Case 9 | DL Category 6 | | | Category 6 | Category 4 |
| Case 10 | DL Category 7 | | | Category 7 | Category 4 |
| Case 11 | DL Category 9 | | Category 9 | Category 6 | Category 4 |
| Case 12 | DL Category 10 | | Category 10 | Category 7 | Category 4 |
| Case 13 | DL Category 11 | Category 11 | Category 9 | Category 6 | Category 4 |
| Case 14 | DL Category 12 | Category 12 | Category 10 | Category 7 | Category 4 |
| Case 15 | DL Category 13 | | | Category 6 or 7 | Category 4 |
| Case 16 | DL Category 14 | | | Category 8 | Category 5 |

FIG. 11

| Bandwidth Class | Aggregated Transmission Bandwidth Configuration | Number of contiguous component carriers |
|---|---|---|
| A | $N_{RB,agg} \leq 100$ | 1 |
| B | $25 < N_{RB,agg} \leq 100$ | 2 |
| C | $100 < N_{RB,agg} \leq 200$ | 2 |
| D | $200 < N_{RB,agg} \leq 300$ | 3 |
| E | $300 < N_{RB,agg} \leq 400$ | 4 |
| F | $400 < N_{RB,agg} \leq 500$ | 5 |

FIG. 12

| ca-BandwidthClassDL-r10 | supportedMIMO-CapabilityDL-r10 | intraBandContiguousCC-InfoList-r12 |
|---|---|---|
| A | 4 | {4} |
| B | 2 | {4, 2} |
| C | 2 | {4, 2} |
| D | 2 | {2, 2, 2} |

FIG. 15

- (1700) The corresponding bit widths for RI feedback for PDSCH transmissions are determined assuming the maximum number of layers as follows:
  - (1701) If the terminal device 1 is configured with transmission mode 3, 4 or 9 for the serving cell, and the *maxLayersMIMO-r10* is configured for the serving cell, the maximum number of layers is determined according to *maxLayersMIMO-r10* for the serving cell
  - (1702) Else if the terminal device 1 is configured with transmission mode 10 for the serving cell, and the *maxLayersMIMO-r11* is configured for the CSI process for the serving cell, the maximum number of layers is determined according to *maxLayersMIMO-r11* for the CSI process for the serving cell
  - (1703) Else,
    - (1704) If the terminal device 1 is configured with transmission mode 9 for the serving cell, and the *supportedMIMO-CapabilityDL-r10* field is included in the *UE-EUTRA-Capability*, the maximum number of layers is determined according to the minimum of (i) the maximum of the configured number of CSI-RS ports for the serving cell and (ii) the maximum of the reported UE downlink MIMO capabilities for the same band in the corresponding band combination.
    - (1705) If the terminal device 1 is configured with transmission mode 9 for the serving cell, and the *supportedMIMO-CapabilityDL-r10* field is not included in the *UE-EUTRA-Capability*, the maximum number of layers is determined according to the minimum of (i) the maximum of the configured number of CSI-RS ports for the serving cell and (iii) *ue-Category* (without suffix).
    - (1706) If the terminal device 1 is configured with transmission mode 10 for the serving cell, and the *supportedMIMO-CapabilityDL-r10* field is included in the *UE-EUTRA-Capability*, the maximum number of layers for each CSI process for the serving cell is determined according to the minimum of the maximum of (iv) the configured number of CSI-RS ports for that CSI process and (ii) the maximum of the reported UE downlink MIMO capabilities for the same band in the corresponding band combination.
    - (1707) If the terminal device 1 is configured with transmission mode 10 for the serving cell, and the *supportedMIMO-CapabilityDL-r10* field is not included in the *UE-EUTRA-Capability*, the maximum number of layers for each CSI process for the serving cell is determined according to the minimum of (iv) the maximum of the configured number of CSI-RS ports for that CSI process and (iii) *ue-Category* (without suffix).
    - (1708) Otherwise the maximum number of layers is determined according to the minimum of (v) the number of PBCH antenna ports and (ii) *ue-Category* (without suffix).

FIG. 17

- (1800) The corresponding bit widths for RI feedback for PDSCH transmissions are determined assuming the maximum number of layers as follows:
  - (1801) If the terminal device 1 is configured with transmission mode 3, 4 or 9 for the serving cell, and the *maxLayersMIMO-r10* is configured for the serving cell, the maximum number of layers is determined according to *maxLayersMIMO-r10* for the serving cell
  - (1802) Else if the terminal device 1 is configured with transmission mode 10 for the serving cell, and the *maxLayersMIMO-r10* is configured for the serving cell, the maximum number of layers is determined according to the minimum of (iv) the maximum of the configured number of CSI-RS ports for that CSI process for the serving cell and *maxLayersMIMO-r10* for the serving cell
  - (1803) Else,
    - (1804) If the terminal device 1 is configured with transmission mode 9 for the serving cell, and the *supportedMIMO-CapabilityDL-r10* field is included in the *UE-EUTRA-Capability*, the maximum number of layers is determined according to the minimum of (i) the maximum of the configured number of CSI-RS ports for the serving cell and (ii) the maximum of the reported UE downlink MIMO capabilities for the same band in the corresponding band combination.
    - (1805) If the terminal device 1 is configured with transmission mode 9 for the serving cell, and the *supportedMIMO-CapabilityDL-r10* field is not included in the *UE-EUTRA-Capability*, the maximum number of layers is determined according to the minimum of (i) the maximum of the configured number of CSI-RS ports for the serving cell and (iii) *ue-Category* (without suffix).
    - (1806) If the terminal device 1 is configured with transmission mode 10 for the serving cell, and the *supportedMIMO-CapabilityDL-r10* field is included in the *UE-EUTRA-Capability*, the maximum number of layers for each CSI process for the serving cell is determined according to the minimum of (iv) the maximum of the configured number of CSI-RS ports for that CSI process and (ii) the maximum of the reported UE downlink MIMO capabilities for the same band in the corresponding band combination.
    - (1807) If the terminal device 1 is configured with transmission mode 10 for the serving cell, and the *supportedMIMO-CapabilityDL-r10* field is not included in the *UE-EUTRA-Capability*, the maximum number of layers for each CSI process for the serving cell is determined according to the minimum of (iv) the maximum of the configured number of CSI-RS ports for that CSI process and (iii) *ue-Category* (without suffix).
    - (1808) Otherwise the maximum number of layers is determined according to the minimum of (v) the number of PBCH antenna ports and (ii) *ue-Category* (without suffix).

FIG. 18

$$\text{Set } k_0 = R_{subblock} \cdot \left( 2 \cdot \left\lceil \frac{N_{cb}}{8 R_{subblock}} \right\rceil \cdot rv_{idx} + 2 \right)$$

Set $k = 0$ and $j = 0$ while $\{ k < E \}$ if $w_{(k_0 + j) \bmod N_{cb}} \neq < NULL >$ $e_k = w_{(k_0 + j) \bmod N_{cb}}$ $k = k + 1$ end if $j = j + 1$ end while

FIG. 20

If $N_{soft}$ = 35982720 or 47431680, $K_C$ = 5, elseif $N_{soft}$ = 7308288 and the terminal device is configured by higher layers with *altCQI-Table-r12*, if the configured maximum number of layers indicated by the *maxLayersMIMO-r10* field for the serving cell is no more than two, or if the maximum of the configured maximum numbers of layers indicated by the *maxLayersMIMO-r11* fields is no more than two, $K_C$ = 3 else $K_C$ = 3/2 end if.

elseif $N_{soft}$ = 3654144 and the configured maximum number of layers indicated by the *maxLayersMIMO-r10* field is no more than two,

*Table-r12*, if the configured maximum number of layers indicated by the *maxLayersMIMO-r10* field is no more than two, or if the maximum of the configured maximum numbers of layers indicated by the *maxLayersMIMO-r11* fields is no more than two, $K_C$ = 2 else $K_C$ = 1

End if.

FIG. 22

| BandCombinationParameters-r10 (P2500) | BandParameters-r10 (P2510) | bandEUTRA-r10 | FreqBandIndicator (P2511) | | Band X |
|---|---|---|---|---|---|
| | | bandParametersDL-r10 | CA-MIMO-ParametersDL-r10 | ca-BandwidthClassDL-r10 (P2512) | A |
| | | | | supportedMIMO-CapabilityDL-r10 (P2513) | 4 |
| | | bandParametersUL-r10 | CA-MIMO-ParametersUL-r10 | ca-BandwidthClassUL-r10 (P2514) | A |
| | BandParameters-r10 (P2520) | bandEUTRA-r10 | FreqBandIndicator (P2521) | | Band X |
| | | bandParametersDL-r10 | CA-MIMO-ParametersDL-r10 | ca-BandwidthClassDL-r10 (P2522) | A |
| | | | | supportedMIMO-CapabilityDL-r10 (P2523) | 2 |

FIG. 25

| BandCombinationParameters-r10 (P2600) | BandParameters-r10 (P2510) | bandEUTRA-r10 | FreqBandIndicator (P2511) | | Band X |
|---|---|---|---|---|---|
| | | bandParametersDL-r10 | CA-MIMO-ParametersDL-r10 | ca-BandwidthClassDL-r10 (P2512) | A |
| | | | | supportedMIMO-CapabilityDL-r10 (P2513) | 4 |
| | | bandParametersUL-r10 | CA-MIMO-ParametersUL-r10 | ca-BandwidthClassUL-r10 (P2514) | A |
| | BandParameters-r10 (P2620) | bandEUTRA-r10 | FreqBandIndicator (P2521) | | Band X |
| | | bandParametersDL-r10 | CA-MIMO-ParametersDL-r10 | ca-BandwidthClassDL-r10 (P2522) | A |
| | | | | supportedMIMO-CapabilityDL-r10 (P2523) | 2 |
| | | bandParametersUL-r10 | CA-MIMO-ParametersUL-r10 | ca-BandwidthClassUL-r10 (P2624) | A |

FIG. 26

TERMINAL DEVICE, BASE STATION DEVICE, COMMUNICATION METHOD, AND INTEGRATED CIRCUIT

TECHNICAL FIELD

The present invention relates to a terminal device, a base station device, a communication method, and an integrated circuit.

This application claims priority based on JP 2015-222859 filed on Nov. 13, 2015, the contents of which are incorporated herein by reference.

BACKGROUND ART

In the 3rd Generation Partnership Project (3GPP), a radio access method and a radio network for cellular mobile communications (hereinafter referred to as "Long Term Evolution (LTE)", or "Evolved Universal Terrestrial Radio Access (EUTRA)") have been studied. In LTE, a base station device is also referred to as an evolved NodeB (eNodeB), and a terminal device is also referred to as User Equipment (UE). LTE is a cellular communication system in which multiple areas each covered by the base station device are deployed to form a cellular structure. A single base station device may manage multiple cells.

There have been introduced to LTE carrier aggregation in which the terminal device communicates with the base station device through aggregated multiple carriers (cells), and Multiple Input Multiple Output (MIMO) in which multiple layers are spatially-multiplexed. The MIMO was introduced at the beginning from LTE Release 8, and the carrier aggregation was introduced at the beginning from LTE Release 10 (NPLs 2, 3, and 4).

In LTE, functions of the MIMO and the carrier aggregation continue to be extended even after the MIMO and the carrier aggregation were introduced. The terminal device transmits capability information indicating technologies of the MIMO and carrier aggregation that the terminal device supports to the base station device (NPL 5).

CITATION LIST

Non Patent Literature

NPL 1: "3GPP TS 36.101 V12.7.0 (2015-03)", 2 Apr. 2015.
NPL 2: "3GPP TS 36.211 V12.5.0 (2015-03)", 26 Mar. 2015.
NPL 3: "3GPP TS 36.212 V12.4.0 (2015-03)", 26 Mar. 2015.
NPL 4: "3GPP TS 36.213 V12.5.0 (2015-03)", 26 Mar. 2015.
NPL 5: "3GPP TS 36.306 V12.4.0 (2015-03)", 27 Mar. 2015.

SUMMARY OF THE INVENTION

Problems to be Solved by the Invention

However, in the radio system described above, there may be a case that an actual operation of the base station device is different from an operation of the base station device assumed by the terminal device so that the base station device and the terminal device cannot correctly communicate with each other. For example, regarding a bit width for a Rank Indicator (RI) fed back to the base station device by the terminal device, rate matching for a code block of a downlink transport block, storing of soft channel bits, and the like, there may be a possibility that an actual operation of the base station device is different from an operation of the base station device assumed by the terminal device, and/or an actual operation of the terminal device is different from an operation of the terminal device assumed by the base station device.

The present invention provides a terminal device, a base station device, a communication method, and an integrated circuit, where the base station device and the terminal device can efficiently communicate with each other.

Means for Solving the Problems (1) According to some aspects of the present invention, the following measures are provided. Specifically, a first aspect of the present invention relates to a terminal device including: a transmission unit configured to transmit a first Rank Indicator (RI) associated with a first CSI-RS resource in a first Channel State Information (CSI) process in a first downlink component carrier for a first bandwidth class of a first band in a first band combination and a second RI associated with a second CSI-RS resource in the first CSI process; and a reception unit configured to receive a Physical Downlink Shared CHannel (PDSCH) in the first downlink component carrier. The first RI and the second RI correspond to transmission of the PDSCH in the first downlink component carrier and correspond to the number of available layers. The transmission unit transmits capability information including first information and second information. The reception unit receives third information indicating a first maximum number of the layers. The first information indicates the first bandwidth class corresponding to the number of downlink component carriers to be supported by the terminal device. The second information is applied to at least one downlink component carrier corresponding to the first bandwidth class and indicates a second maximum number of the layers to be supported by the terminal device in a downlink. In a case that the third information is configured, a third maximum number of the layers assumed for determining a bit width for the first RI and a fourth maximum number of the layers assumed for determining a bit width for the second RI are provided, based on the third information. In a case that the third information is not configured, the third maximum number of the layers assumed for determining the bit width for the first RI and the fourth maximum number of the layers assumed for determining the bit width for the second RI are provided, based on a smallest one of the first number and a second number. The first number is the second maximum number of the layers indicated by the second information. The second number is a largest one of the number of antenna ports of the first CSI-RS resource and the number of antenna ports of the second CSI-RS resource.

(2) A second aspect of the present invention relates to a base station device including: a reception unit configured to receive a first Rank Indicator (RI) associated with a first CSI-RS resource in a first Channel State Information (CSI) process in a first downlink component carrier for a first bandwidth class of a first band in a first band combination and a second RI associated with a second CSI-RS resource in the first CSI process; and a transmission unit configured to transmit a Physical Downlink Shared CHannel (PDSCH) in the first downlink component carrier. The first RI and the second RI correspond to transmission of the PDSCH in the first downlink component carrier and correspond to the number of available layers. The reception unit receives capability information including first information and second information. The transmission unit transmits third information indicating a first maximum number of the layers. The first information indicates the first bandwidth class corresponding to the number of downlink component carriers to be supported by the terminal device. The second information is applied to at least one downlink component carrier corresponding to the first bandwidth class and indicates a second maximum number of the layers to be supported by the terminal device in a downlink. In a case that the third information is configured, a third maximum number of the layers assumed for determining a bit width for the first RI and a fourth maximum number of the layers assumed for determining a bit width for the second RI are provided, based on the third information. In a case that the third information is not configured, the third maximum number of the layers assumed for determining the bit width for the first RI and the fourth maximum number of the layers assumed for determining the bit width for the second RI are provided, based on a smallest one of the first number and a second number. The first number is the second maximum number of the layers indicated by the second information. The second number is a largest one of the number of antenna ports of the first CSI-RS resource and the number of antenna ports of the second CSI-RS resource.

(3) A third aspect of the present invention relates to a communication method used by a terminal device, the method including the steps of: transmitting a first Rank Indicator (RI) associated with a first CSI-RS resource in a first Channel State Information (CSI) process in a first downlink component carrier for a first bandwidth class of a first band in a first band combination and a second RI associated with a second CSI-RS resource in the first CSI process; receiving a Physical Downlink Shared CHannel (PDSCH) in the first downlink component carrier, the first RI and the second RI corresponding to transmission of the PDSCH in the first downlink component carrier, and corresponding to the number of available layers; transmitting capability information including first information and second information; and receiving third information indicating a first maximum number of the layers. The first information indicates the first bandwidth class corresponding to the number of downlink component carriers to be supported by the terminal device. The second information is applied to at least one downlink component carrier corresponding to the first bandwidth class and indicates a second maximum number of the layers to be supported by the terminal device in a downlink. In a case that the third information is configured, a third maximum number of the layers assumed for determining a bit width for the first RI and a fourth maximum number of the layers assumed for determining a bit width for the second RI are provided, based on the third information. In a case that the third information is not configured, the third maximum number of the layers assumed for determining the bit width for the first RI and the fourth maximum number of the layers assumed for determining the bit width for the second RI are provided, based on a smallest one of the first number and a second number. The first number is the second maximum number of the layers indicated by the second information. The second number is a largest one of the number of antenna ports of the first CSI-RS resource and the number of antenna ports of the second CSI-RS resource.

(4) A fourth aspect of the present invention relates to a communication method used by a base station device, the method including the steps of: receiving a first Rank Indicator (RI) associated with a first CSI-RS resource in a first Channel State Information (CSI) process in a first downlink component carrier for a first bandwidth class of a first band in a first band combination and a second RI associated with a second CSI-RS resource in the first CSI process; transmitting a Physical Downlink Shared CHannel (PDSCH) in the first downlink component carrier, the first RI and the second RI corresponding to transmission of the PDSCH in the first downlink component carrier, and corresponding to the number of available layers; receiving capability information including first information and second information; and transmitting third information indicating a first maximum number of the layers. The first information indicates the first bandwidth class corresponding to the number of downlink component carriers to be supported by the terminal device. The second information is applied to at least one downlink component carrier corresponding to the first bandwidth class and indicates a second maximum number of the layers to be supported by the terminal device in a downlink. In a case that the third information is configured, a third maximum number of the layers assumed for determining a bit width for the first RI and a fourth maximum number of the layers assumed for determining a bit width for the second RI are provided, based on the third information. In a case that the third information is not configured, the third maximum number of the layers assumed for determining the bit width for the first RI and the fourth maximum number of the layers assumed for determining the bit width for the second RI are provided, based on a smallest one of the first number and a second number. The first number is the second maximum number of the layers indicated by the second information. The second number is a largest one of the number of antenna ports of the first CSI-RS resource and the number of antenna ports of the second CSI-RS resource.

Effects of the Invention

According to the present invention, the terminal device and the base station device can efficiently communicate with each other.

BRIEF DESCRIPTION OF DRAWINGS

FIG. 8 is a diagram illustrating an example of correspondence among a transmission mode, a DCI format, and a transmission scheme of PDSCH according to the present embodiment.

FIG. 9 is a diagram illustrating an example of a UE category according to the present embodiment.

FIG. 10 is a diagram illustrating an example of a downlink UE category according to the present embodiment.

FIG. 11 is a diagram illustrating an example of a combination of categories indicated by multiple capability parameters according to the present embodiment.

FIG. 12 is a diagram illustrating an example of a bandwidth class according to the present embodiment.

FIG. 15 is a diagram illustrating an example of a combination of the bandwidth class and MIMO capability according to the present embodiment.

FIG. 17 is a diagram illustrating an algorithm/pseudo-code of a fifth example for a method of specifying a bit width for a RI.

FIG. 18 is a diagram illustrating an algorithm/pseudo-code of a sixth example for the method of specifying a bit width for a RI.

FIG. 20 is a diagram illustrating an example of bit selection and pruning according to the present embodiment.

FIG. 22 is a diagram illustrating an example of a method of configuring $K_c$ according to the present embodiment.

FIG. 25 is a diagram illustrating an example of a parameter BandCombinationParameters-r10 according to the present embodiment.

FIG. 26 is a diagram illustrating an example of a parameter BandCombinationParameters-r10 according to the present embodiment.

MODE FOR CARRYING OUT THE INVENTION

Embodiments of the present invention will be described below.

In the present embodiment, multiple cells are configured for a terminal device. A technology in which the terminal device communicates via the multiple cells is referred to as cell aggregation or carrier aggregation. The present invention may apply to each of the multiple cells configured for the terminal device. Furthermore, the present invention may apply to some of the configured multiple cells. Each of the cells configured for the terminal device is also referred to as a serving cell/downlink cell. Any one of a Time Division Duplex (TDD) scheme and a Frequency Division Duplex (FDD) scheme is applied to each of the cells.

The configured multiple serving cells include one Primary Cell (PCell) and one or multiple secondary cells (SCells). The primary cell is a serving cell in which an initial connection establishment procedure has been performed, a serving cell in which a connection re-establishment procedure has been started, or a cell indicated as a primary cell during a handover procedure. At a point of time when a Radio Resource Control (RRC) connection is established, or later, a secondary cell(s) may be configured.

A carrier corresponding to a cell in the downlink is referred to as a downlink component carrier. A carrier corresponding to a cell in the uplink is referred to as an uplink component carrier. The component carrier includes transmission bandwidth configuration. For example, the transmission bandwidth configuration is 1.4 MHz, 5 MHz, 10 MHz, 15 MHz, or 20 MHz.

Figure 1:
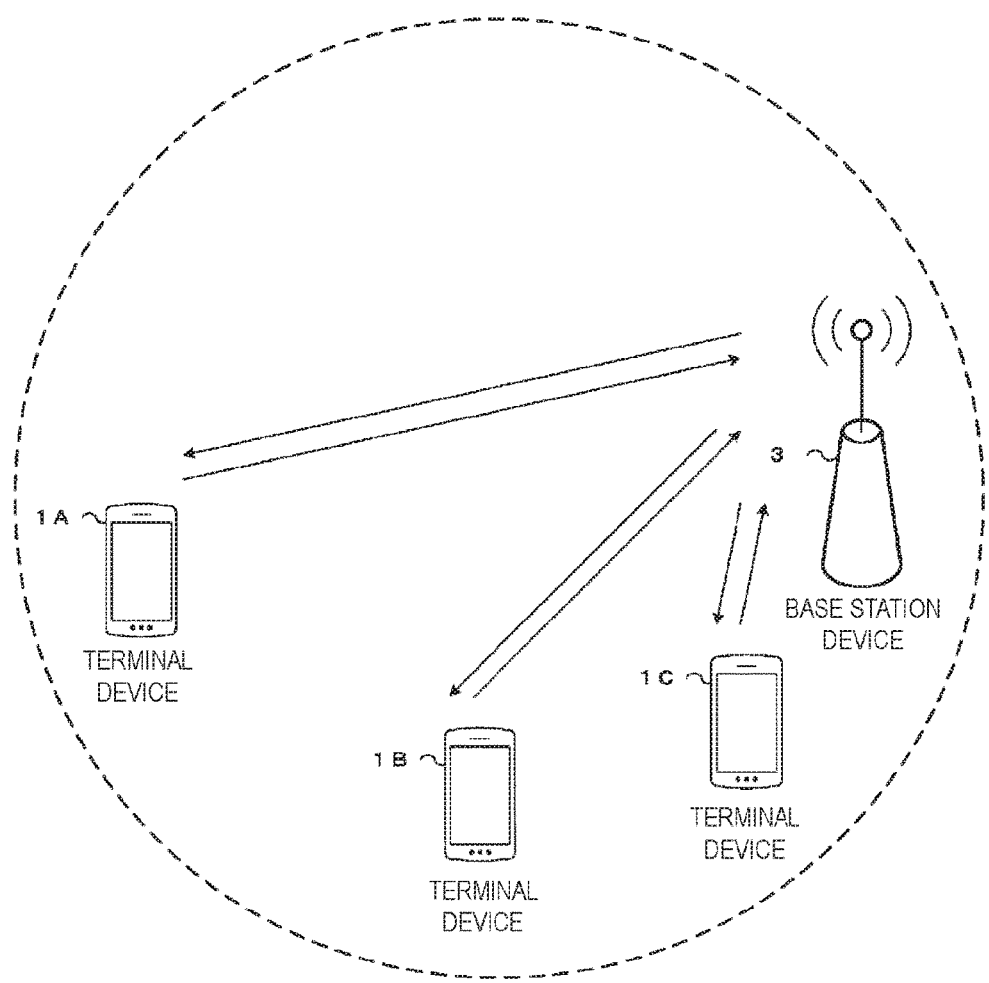
FIG. 1 is a conceptual diagram of a radio communication system according to the present embodiment.

FIG. 1 is a conceptual diagram of a radio communication system according to the present embodiment. In FIG. 1, the radio communication system includes terminal devices 1A to 1C and a base station device 3. Each of the terminal devices 1A to 1C is referred to as a terminal device 1 below.

Physical channels and physical signals according to the present embodiment will be described.

With respect to FIG. 1, the following uplink physical channels are used for uplink radio communication from the terminal device 1 to the base station device 3. The uplink physical channels are used for transmission of information output from higher layers.

Physical Uplink Control Channel (PUCCH)
Physical Uplink Shared Channel (PUSCH)
Physical Random Access Channel (PRACH)

The PUCCH is a physical channel that is used to transmit Uplink Control Information (UCI). The pieces of Uplink Control Information include downlink Channel State Information (CSI), a Scheduling Request (SR) indicating a request for a PUSCH resource, and an ACKnowledgement (ACK)/Negative-ACKnowledgement (NACK) for downlink data (a transport block or a Downlink-Shared CHannel (DL-SCH)). The ACK/NACK is also referred to as an HARQ-ACK, HARQ feedback, or response information.

The channel state information includes a Channel Quality Indicator (CQI), a Rank Indicator (RI), and a Precoding Matrix Indicator (PMI). The CQI expresses a combination of a modulation scheme and a coding rate for a single transport block to be transmitted on the PDSCH. The RI indicates the number of available layers determined by the terminal device 1. The PMI indicates a codebook determined by the terminal device 1. The codebook relates to precoding the PDSCH.

The channel state information may be reported for each cell, for CSI process, and/or for each resource on which Non-Zero Power Channel State Information-Reference Signal (NZP CSI-RS) is transmitted.

The PUSCH is a physical channel that is used to transmit uplink data (Uplink-Shared Channel (UL-SCH)). Furthermore, the PUSCH may be used to transmit the HARQ-ACK and/or channel state information along with the uplink data. Furthermore, the PUSCH may be used to transmit only the channel state information or to transmit only the HARQ-ACK and the channel state information.

The PRACH is a physical channel that is used to transmit a random access preamble.

In FIG. 1, the following uplink physical signal is used in the uplink radio communication. The uplink physical signal is not used to transmit information output from higher layer, but is used by a physical layer.

Uplink Reference Signal (UL RS)

According to the present embodiment, the following two types of uplink reference signals are used.

Demodulation Reference Signal (DMRS)
Sounding Reference Signal (SRS)

The DMRS is associated with transmission of the PUSCH or the PUCCH. The SRS is not associated with the transmission of the PUSCH or the PUCCH.

In FIG. 1, the following downlink physical channels are used for downlink radio communication from the base station device 3 to the terminal device 1. The downlink physical channels are used for transmission of information output from higher layers.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)
Physical Multicast Channel (PMCH)

The PBCH is used for broadcasting a Master Information Block (MIB), or a Broadcast Channel (BCH), that is shared by the terminal devices 1. The MIB is transmitted at intervals of 40 ms, and, within the interval, the MIB is repeatedly transmitted every 10 ms. Specifically, initial transmission of the MIB is performed in a subframe 0 in a radio frame that satisfies SFN mod 4=0, and re-transmission (repetition) of the MIB is performed in subframes 0 in all the other radio frames. A system frame number (SFN) is a radio frame number. The MIB is system information. For example, the MIB includes information indicating the SFN. The PBCH is transmitted at some or all of transmit antenna ports 0 to 3.

The PCFICH is used for transmission of information indicating a region (OFDM symbols) to be used for transmission of the PDCCH.

The PHICH is used for transmission of a HARQ indicator (HARQ feedback or response information) indicating an ACKnowledgement (ACK) or a Negative ACKnowledgement (NACK) for the uplink data (Uplink Shared Channel (UL-SCH)) received by the base station device 3.

The PDCCH and the EPDCCH are used for transmission of Downlink Control Information (DCI). The Downlink Control Information is also referred to as a DCI format. The Downlink Control Information includes a downlink grant and an uplink grant. The downlink grant is also referred to as downlink assignment or downlink allocation.

The downlink grant is used for scheduling of a single PDSCH within a single cell. The downlink grant is used for scheduling of the PDSCH within the same subframe as the subframe in which the downlink grant is transmitted. The uplink grant is used for scheduling of a single PUSCH within a single cell. The uplink grant is used for scheduling of a single PUSCH within the fourth or later subframe from the subframe in which the uplink grant is transmitted.

Cyclic Redundancy Check (CRC) parity bits are attached to the DCI format. The CRC parity bits are scrambled with a Cell-Radio Network Temporary Identifier (C-RNTI) or a Semi Persistent Scheduling Cell-Radio Network Temporary Identifier (SPS C-RNTI). The C-RNTI and the SPS C-RNTI are identifiers for identifying the terminal device 1 within a cell. The C-RNTI is used to control the PDSCH or PUSCH in a single subframe. The SPS C-RNTI is used to periodically allocate a resource for the PDSCH or PUSCH.

The PDSCH is used for transmission of downlink data (Downlink Shared Channel (DL-SCH)).

The PMCH is used for transmission of multicast data (Multicast Channel (MCH)).

In FIG. 1, the following downlink physical signals are used for downlink radio communication. The downlink physical signals are not used to transmit the information output from higher layer, but are used by the physical layer.

Synchronization signal (SS)
Downlink Reference Signal (DL RS)

The synchronization signal is used for the terminal device 1 to be synchronized to frequency and time domains in the downlink.

The downlink reference signal is used for the terminal device 1 to perform channel compensation on a downlink physical channel. The downlink reference signal is used in order for the terminal device 1 to calculate the downlink channel state information.

According to the present embodiment, the following five types of downlink reference signals are used.

Cell-specific Reference Signal (CRS)
UE-specific Reference Signal (URS) associated with the PDSCH
Demodulation Reference Signal (DMRS) associated with the EPDCCH
Non-Zero Power Channel State Information-Reference Signal (NZP CSI-RS)
Zero Power Channel State Information-Reference Signal (ZP CSI-RS)
Multimedia Broadcast and Multicast Service over Single Frequency Network Reference signal (MBSFN RS)
Positioning Reference Signal (PRS)

The CRS is transmitted in the entire band of a subframe. The CRS is used to perform demodulation of the PBCH/PDCCH/PHICH/PCFICH/PDSCH. The CRS may be used in order for the terminal device 1 to calculate the downlink channel state information. The PBCH/PDCCH/PHICH/PCFICH is transmitted on an antenna port used for transmission of the CRS.

The URS relating to the PDSCH is transmitted in a subframe and in a band that are used for transmission of the PDSCH to which the URS relates. The URS is used to demodulate the PDSCH to which the URS relates.

The PDSCH is transmitted on an antenna port used for transmission of the CRS or the URS. For example, DCI format 1A is used to schedule the PDSCH transmitted on the antenna port used for the transmission of the CRS. For example, DCI format 2B, DCI format 2C, and DCI format 2D are used to schedule the PDSCH transmitted on the antenna port used for the transmission of the URS.

The DMRS relating to EPDCCH is transmitted in a subframe and a band that are used for transmission of the EPDCCH to which the DMRS relates. The DMRS is used to demodulate the EPDCCH to which the DMRS relates. The EPDCCH is transmitted on an antenna port used for transmission of the DMRS.

The NZP CSI-RS is transmitted in a subframe that is configured. A resource on which the NZP CSI-RS is transmitted is configured by the base station device. The NZP CSI-RS is used by the terminal device 1 to calculate the downlink channel state information. The terminal device 1 performs signal measurement (channel measurement), using the NZP CSI-RS. The NZP CSI-RS is transmitted at some or all of transmit antenna ports 15 to 22. The terminal device 1 configures/specifies the transmit antenna port for transmission of the NZP CSI-RS, based on the information received from the base station device 3. Multiple resources on which the NZP CSI-RS is transmitted may be configured for one serving cell. Multiple resources on which the NZP CSI-RS is transmitted may be configured for one CSI process. The number of transmit antenna ports for transmission of the NZP CSI-RS may be configured for each of multiple resources on which the NZP CSI-RS is transmitted. One serving cell may correspond to one or multiple CSI processes. One CSI process may correspond to one or multiple NZP CSI-RS resources. The NZP CSI-RS resource is a resource on which the NZP CSI-RS is transmitted. The transmit antenna port for transmission of the NZP CSI-RS is also referred to as a CSI-RS port or NZP CSI-RS port.

A resource for the ZP CSI-RS is configured by the base station device 3. With zero output, the base station device 3 transmits the ZP CSI-RS. To be more precise, the base station device 3 does not transmit the ZP CSI-RS. The base station device 3 transmits neither the PDSCH nor the EPDCCH in a resource configured for the ZP CSI-RS. For example, in a certain cell, the terminal device 1 can measure interference in a resource corresponding to the NZP CSI-RS.

The MBSFN RS is transmitted in the entire band of a subframe used for transmission of the PMCH. The MBSFN RS is used to demodulate the PMCH. The PMCH is transmitted on the antenna port used for transmission of the MBSFN RS.

The PRS may be used to measure a Reference Signal Time Difference (RSTD). The RSTD is defined by a relative timing difference between a neighbor cell and a reference cell.

The downlink physical channels and the downlink physical signals are collectively referred to as a downlink signal. The uplink physical channels and the uplink physical signals are collectively referred to as an uplink signal. The downlink physical channels and the uplink physical channels are collectively referred to as physical channels. The downlink physical signals and the uplink physical signals are collectively referred to as physical signals.

The BCH, the MCH, the UL-SCH, and the DL-SCH are transport channels. A channel used in a Medium Access Control (MAC) layer is referred to as a transport channel. A unit of the transport channel used in the MAC layer is also referred to as a transport block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subjected to coding processing on a codeword-by-codeword basis.

A configuration of the radio frame according to the present embodiment will be described below.

Figure 2:
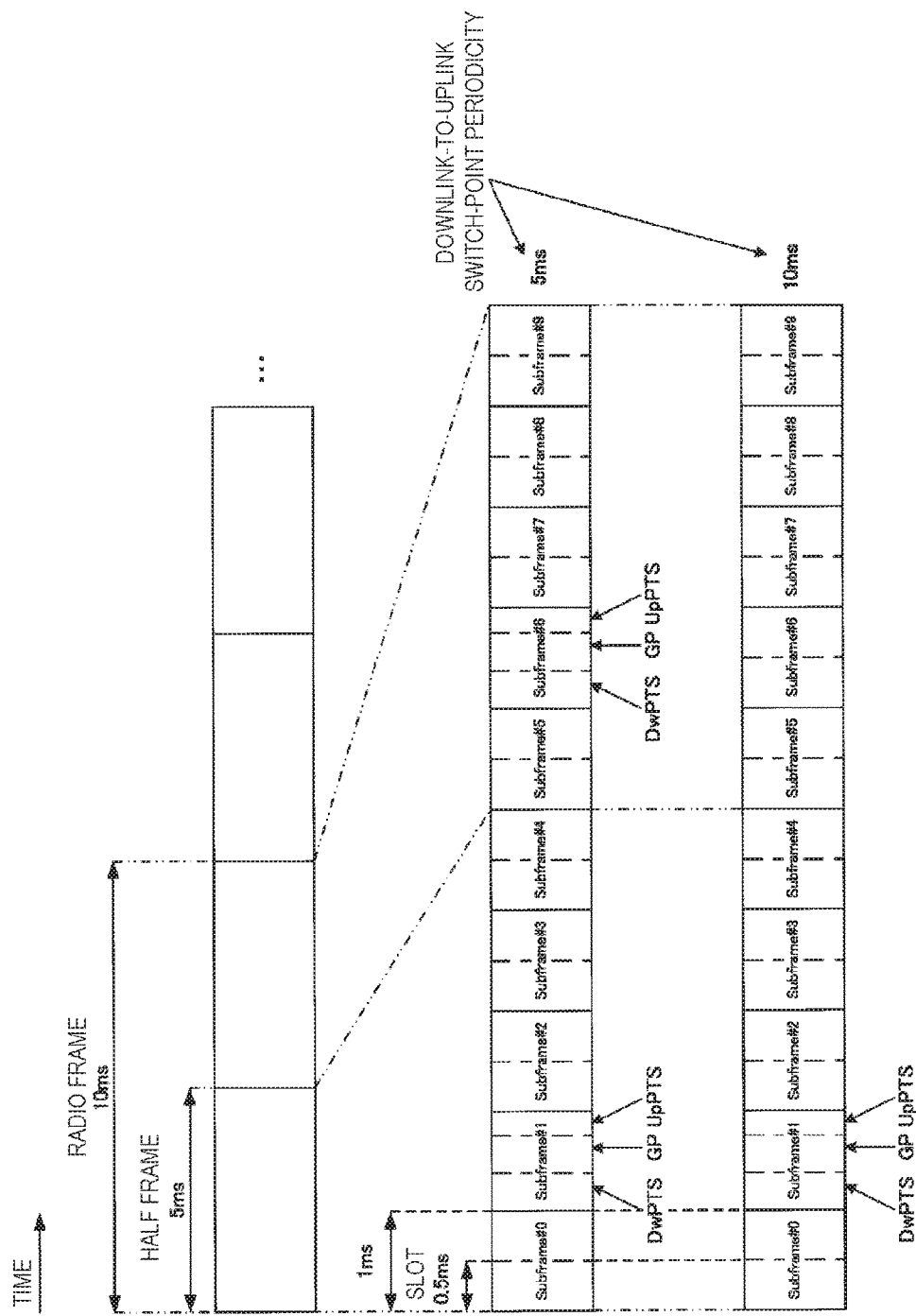
FIG. 2 is a diagram illustrating a schematic configuration of a radio frame according to the present embodiment.

FIG. 2 is a diagram illustrating a schematic configuration of the radio frame according to the present embodiment. Each of the radio frames is 10 ms in length. In FIG. 2, the horizontal axis is a time axis. Furthermore, each of the radio frames is constituted of two half frames. Each of the half frames is 5 ms in length. Each of the half frames is constituted of five subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. To be more precise, 10 subframes can be used at each interval of 10 ms.

According to the present embodiment, the following three types of subframes are defined.

Downlink subframe (a first subframe)
Uplink subframe (a second subframe)
Special subframe (a third subframe)

The downlink subframe is a subframe reserved for the downlink transmission. The uplink subframe is a subframe reserved for the uplink transmission. The special subframe is constituted of three fields. The three fields are a Downlink Pilot Time Slot (DwPTS), a Guard Period (GP), and an Uplink Pilot Time Slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted of only the DwPTS and the GP, or may be constituted of only the GP and the UpPTS.

A single radio frame is constituted of at least the downlink subframe, the uplink subframe, and the special subframe.

The radio communication system according to the present embodiment supports 5 ms downlink-to-uplink switch-point periodicity and 10 ms downlink-to-uplink switch-point periodicity. In a case where the downlink-to-uplink switch-point periodicity is 5 ms, both of the half frames within the radio frame include the special subframe. In a case where the downlink-to-uplink switch-point periodicity is 10 ms, only the first half frame within the radio frame includes the special subframe.

A configuration of a slot in the present embodiment will be described below.

Figure 3:
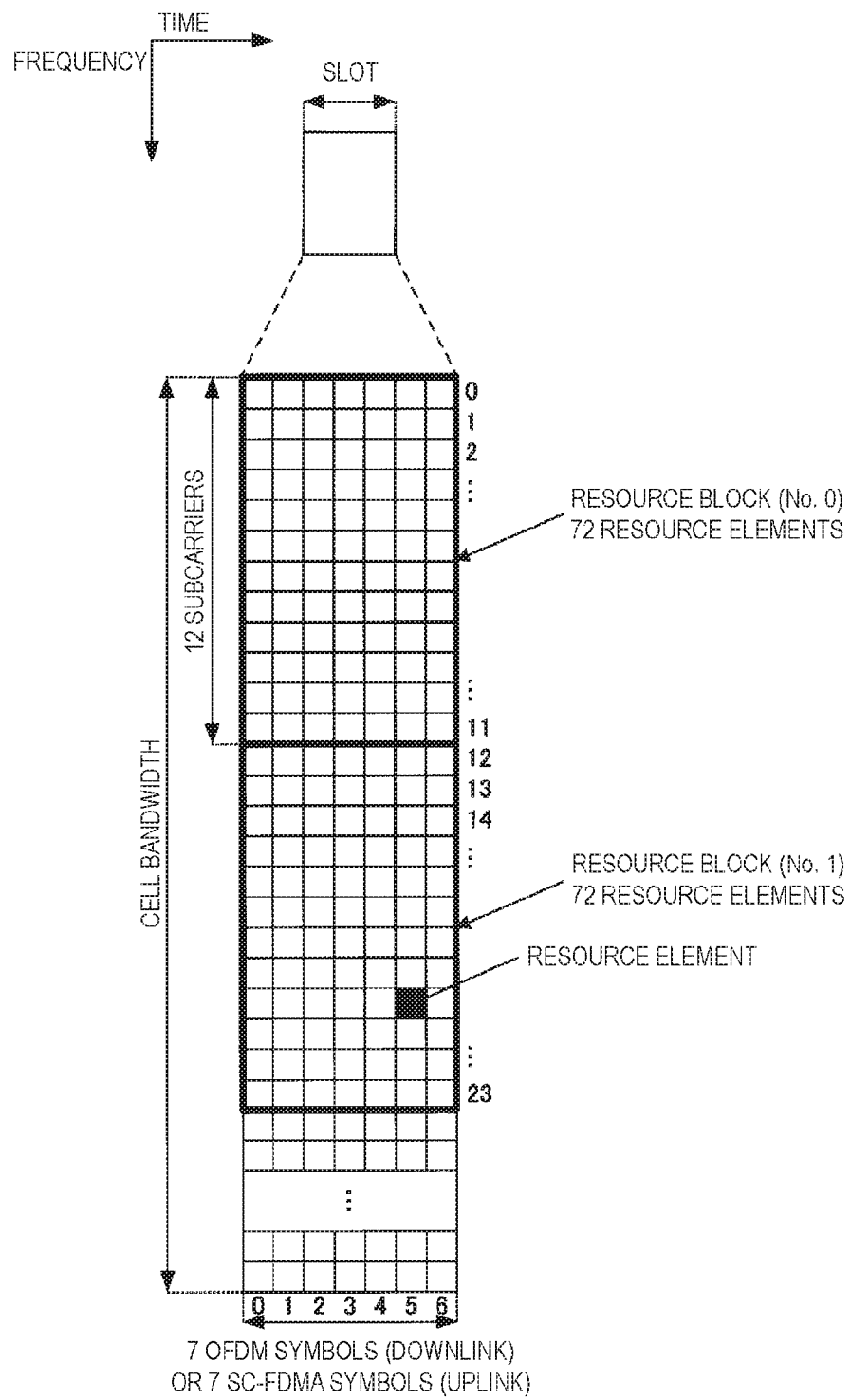
FIG. 3 is a diagram illustrating a configuration of a slot according to the present embodiment.

FIG. 3 is a diagram illustrating a configuration of a slot according to the present embodiment. In the present embodiment, a normal Cyclic Prefix (CP) is applied to an OFDM symbol. Note that an extended Cyclic Prefix (CP) may be applied to the OFDM symbol. The physical signal or the physical channel transmitted in each of the slots is expressed by a resource grid. In FIG. 3, the horizontal axis is a time axis, and the vertical axis is a frequency axis. In the downlink, the resource grid is defined by multiple subcarriers and multiple OFDM symbols. In the uplink, the resource grid is defined by multiple subcarriers and multiple SC-FDMA symbols. The number of subcarriers constituting one slot depends on a cell bandwidth. The number of OFDM symbols or SC-FDMA symbols constituting one slot is seven. Each element within the resource grid is referred to as a resource element. The resource element is identified by a subcarrier number, and an OFDM symbol number or an SC-FDMA symbol number.

A resource block is used to express mapping of a certain physical channel (such as the PDSCH or the PUSCH) to resource elements. For the resource block, a virtual resource block and a physical resource block are defined. A certain physical channel is first mapped to a virtual resource block. Thereafter, the virtual resource block is mapped to a physical resource block. One physical resource block is defined by seven consecutive OFDM symbols or SC-FDMA symbols in a time domain and by 12 consecutive subcarriers in a frequency domain. Hence, one physical resource block includes (7×12) resource elements. Furthermore, one physical resource block corresponds to one slot in the time domain and corresponds to 180 kHz in the frequency domain. The physical resource blocks are numbered from 0 in the frequency domain.

Figure 4:
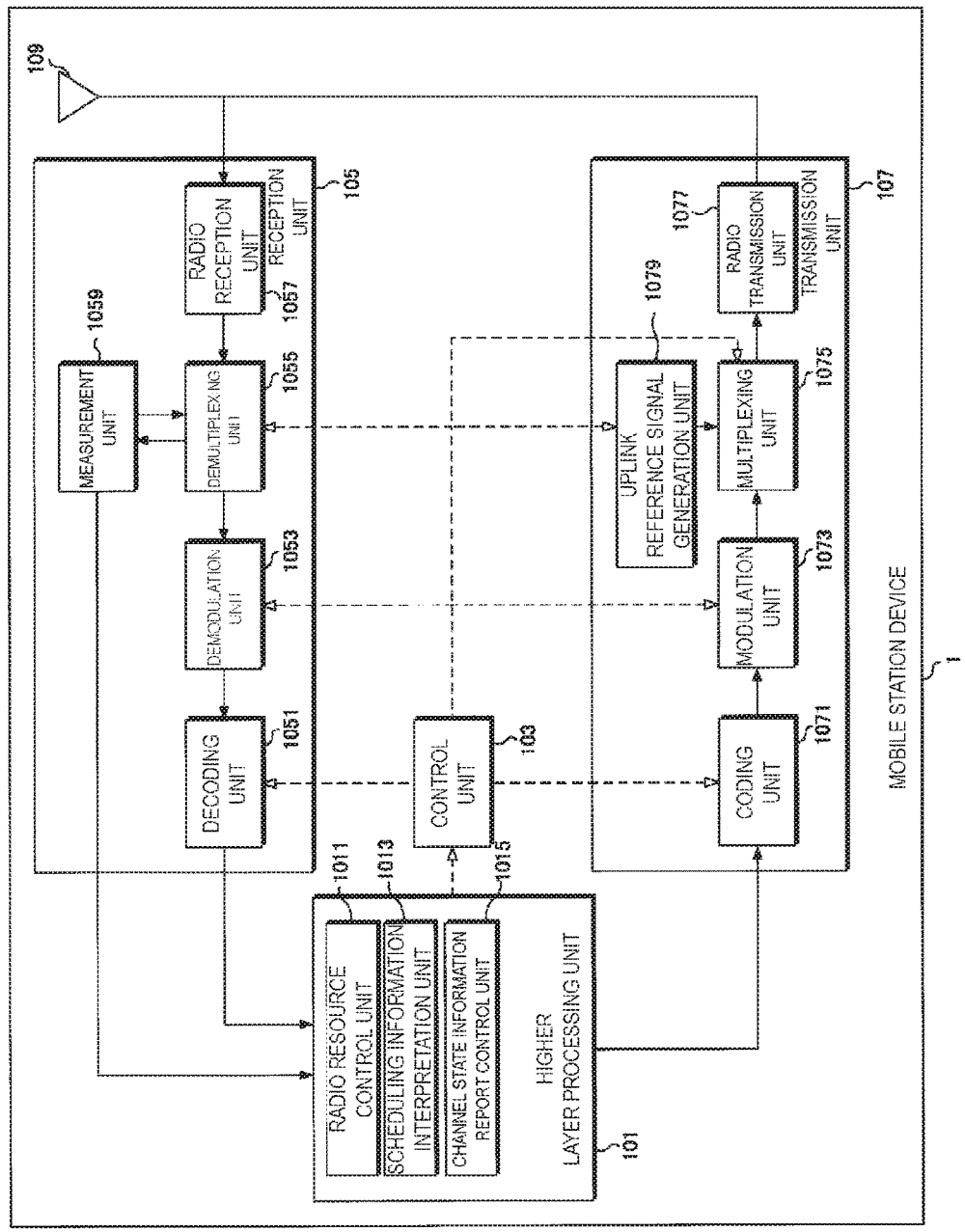
FIG. 4 is a schematic block diagram illustrating a configuration of a terminal device 1 according to the present embodiment.

FIG. 4 is a schematic block diagram illustrating a configuration of the terminal device 1 according to the present embodiment. As illustrated in the figure, the terminal device 1 is configured to include a higher layer processing unit 101, a control unit 103, a reception unit 105, a transmission unit 107, and a transmit and/or receive antenna 109. Furthermore, the higher layer processing unit 101 is configured to include a radio resource control unit 1011, a scheduling information interpretation unit 1013, and a Channel State Information (CSI) report control unit 1015. Furthermore, the reception unit 105 is configured to include a decoding unit 1051, a demodulation unit 1053, a demultiplexing unit 1055, a radio reception unit 1057, and a measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the Medium Access Control (MAC) layer, a Packet Data Convergence Protocol (PDCP) layer, a Radio Link Control (RLC) layer, and a Radio Resource Control (RRC) layer.

The radio resource control unit 1011 included in the higher layer processing unit 101 manages various pieces of configuration information of the terminal device 1 itself. Furthermore, the radio resource control unit 1011 generates information to be mapped to each uplink channel, and outputs the generated information to the transmission unit 107.

The scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

The CSI report control unit 1015 instructs the measurement unit 1059 to derive Channel State Information (RI/PMI/CQI) relating to the CSI reference resource. The CSI report control unit 1015 instructs the transmission unit 107 to transmit an RI/PMI/CQI. The CSI report control unit 1015 sets a configuration that is used when the measurement unit 1059 calculates CQI.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and/or receive antenna 109, and outputs the resulting information to the higher layer processing unit 101.

The radio reception unit 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into the PHICH, PDCCH, EPDCCH, PDSCH, and the downlink reference signal. Furthermore, the demultiplexing unit 1055 makes a compensation of channels including the PHICH, PDCCH, EPDCCH, and PDSCH, from a channel estimate input from the measurement unit 1059. Furthermore, the demultiplexing unit 1055 outputs the downlink reference signal resulting from the demultiplexing, to the measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs Downlink Control Information resulting from the decoding and an RNTI to which the Downlink Control Information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information of a coding rate notified with the Downlink Control Information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055. The measurement unit 1059 outputs, to the higher layer processing unit 101, the measurement result and CSI calculated based on the measurement result. Furthermore, the measurement unit 1059 calculates a downlink channel estimate from the downlink reference signal and outputs the calculated downlink channel estimate to the demultiplexing unit 1055.

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and/or receive antenna 109.

The coding unit 1071 performs coding on the Uplink Control Information and the uplink data input from the higher layer processing unit 101. The modulation unit 1073 modulates coded bits input from the coding unit 1071, in compliance with the modulation scheme such as BPSK, QPSK, 16 QAM, or 64 QAM.

The uplink reference signal generation unit 1079 generates a sequence acquired according to a rule (equation) predetermined in advance, based on a physical cell identifier (also referred to as a physical cell identity (PCI), a cell ID, or the like) for identifying the base station device 3, a bandwidth to which the uplink reference signal is mapped, a cyclic shift notified with the uplink grant, a parameter value for generation of a DMRS sequence, and the like.

On the basis of the information used for the scheduling of PUSCH, the multiplexing unit 1075 determines the number of PUSCH layers to be spatial-multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the control unit 103, the multiplexing unit 1075 performs Discrete Fourier Transform (DFT) on modulation symbols of the PUSCH. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, performs modulation in compliance with an SC-FDMA scheme, attaches the Guard Interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

Figure 5:
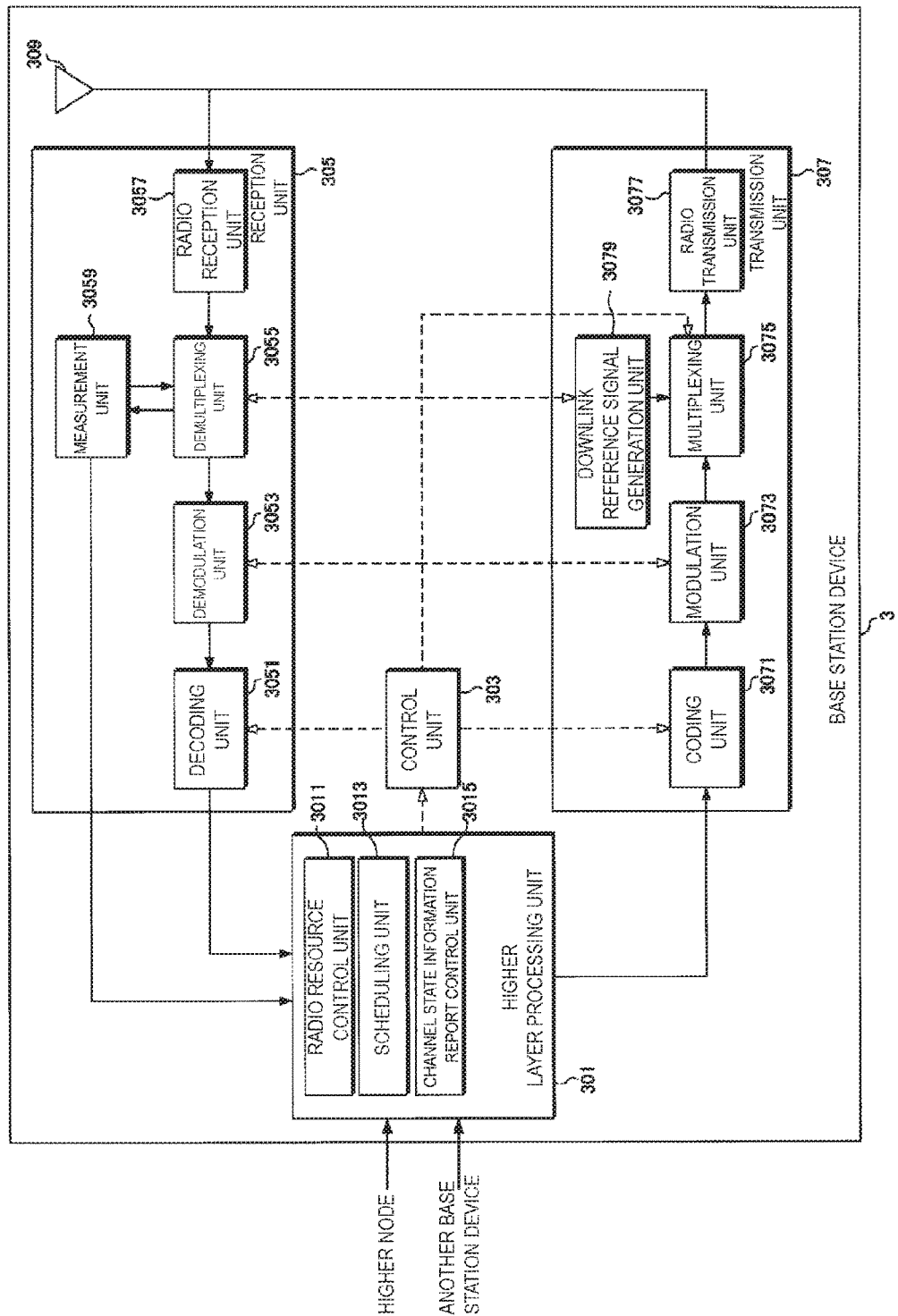
FIG. 5 is a schematic block diagram illustrating a configuration of a base station device 3 according to the present embodiment.

FIG. 5 is a schematic block diagram illustrating a configuration of the base station device 3 according to the present embodiment. As is illustrated in the figure, the base station device 3 is configured to include a higher layer processing unit 301, a control unit 303, a reception unit 305, a transmission unit 307, and a transmit and/or receive antenna 309. The higher layer processing unit 301 is configured to include a radio resource control unit 3011, a scheduling unit 3013, and a CSI report control unit 3015. The reception unit 305 is configured to include a decoding unit 3051, a demodulation unit 3053, a demultiplexing unit 3055, a radio reception unit 3057, and a measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, a RRC message, a MAC Control Element (CE), and the like, and outputs a result of the generation or the acquirement to the transmission unit 307. Furthermore, the radio resource control unit 3011 manages various configuration information for each of the terminal devices 1.

The scheduling unit 3013 included in the higher layer processing unit 301 determines a frequency and a subframe to which the physical channels (PDSCH and PUSCH) are allocated, the coding rate and modulation scheme for the physical channels (PDSCH and PUSCH), the transmit power, and the like, from the received channel state information and from the channel estimate, channel quality, or the like input from the measurement unit 3059. The scheduling unit 3013 generates the control information in order to control the reception unit 305 and the transmission unit 307 in accordance with a result of the scheduling, and outputs the generated information to the control unit 303. The scheduling unit 3013 generates the information (e.g., the DCI format) to be used for the scheduling of the physical channels (PDSCH and PUSCH), based on the result of the scheduling.

The CSI report control unit 3015 included in the higher layer processing unit 301 controls a CSI report that is made by the terminal device 1. The CSI report control unit 3015 transmits information that is assumed in order for the terminal device 1 to derive RI/PMI/CQI in the CSI reference resource and that shows various configurations, to the terminal device 1 through the transmission unit 307.

On the basis of the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and/or receive antenna 309, and outputs information resulting from the decoding to the higher layer processing unit 301. The radio reception unit 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and orthogonal component of the received signal, and converts the resulting orthogonally-demodulated analog signal into a digital signal.

The radio reception unit 3057 removes a portion corresponding to the Guard Interval (GI) from the digital signal resulting from the conversion. The radio reception unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed based on radio resource allocation information that is determined in advance by the base station device 3 using the radio resource control unit 3011 and that is included in the uplink grant notified to each of the terminal devices 1. Furthermore, the demultiplexing unit 3055 makes a compensation of channels including the PUCCH and PUSCH from the channel estimate input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and PUSCH, in compliance with the modulation scheme predetermined in advance, such as Binary Phase Shift Keying (BPSK), QPSK, 16 QAM, or 64 QAM, or in compliance with the modulation scheme that the base station device 3 itself notifies in advance each of the terminal devices 1 with the uplink grant. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal devices 1 and information indicating the precoding to be performed on the sequences.

The decoding unit 3051 decodes the coded bits of PUCCH and PUSCH, which have been demodulated, at the coding rate in compliance with a coding scheme predetermined in advance, the coding rate being predetermined in advance or being notified in advance with the uplink grant to the terminal device 1 by the base station device 3 itself, and outputs the decoded uplink data and the Uplink Control Information to the higher layer processing unit 101. In a case where the PUSCH is re-transmitted, the decoding unit 3051 performs the decoding with the coded bits input from the higher layer processing unit 301 and retained in an HARQ buffer, and the demodulated coded bits. The measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the Downlink Control Information, and the downlink data that are input from the higher layer processing unit 301, multiplexes the PHICH, PDCCH, EPDCCH, PDSCH, and the downlink reference signal, and transmits a result of the multiplexing to the terminal device 1 through the transmit and/or receive antenna 309.

The coding unit 3071 performs coding on the HARQ indicator, the Downlink Control Information, and the downlink data input from the higher layer processing unit 301. The modulation unit 3073 modulates the coded bits input from the coding unit 3071, in compliance with the modulation scheme such as BPSK, QPSK, 16 QAM, or 64 QAM.

The downlink reference signal generation unit 3079 generates, as the downlink reference signal, a sequence that is already known to the terminal device 1 and that is acquired in accordance with a rule predetermined in advance based on the Physical Cell Identity (PCI) for identifying the base station device 3, or the like.

The multiplexing unit 3075, in accordance with the number of PDSCH layers to be spatial-multiplexed, maps one or multiple pieces of downlink data to be transmitted on one PUSCH to one or multiple layers, and performs precoding on the one or multiple layers. The multiplexing unit 375 multiplexes the downlink physical channel signal and the downlink reference signal for each transmit antenna port. Furthermore, the multiplexing unit 375 allocates the downlink physical channel signal and the downlink reference signal to the resource element for each transmit antenna port.

The radio transmission unit 3077 performs Inverse Fast Fourier Transform (IFFT) on the modulation symbol resulting from the multiplexing or the like, performs the modulation in compliance with an OFDM scheme to generate an OFDM symbol, attaches the Guard Interval to the OFDM-modulated OFDM symbol, generates a digital signal in a baseband, converts the digital signal in the baseband into an analog signal, generates an in-phase component and orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and/or receive antenna 309 for transmission.

Each of the units in FIG. 4 and FIG. 5 may be configured as a circuit. For example, the transmission unit 107 may be a transmission circuit 107.

Figure 6:
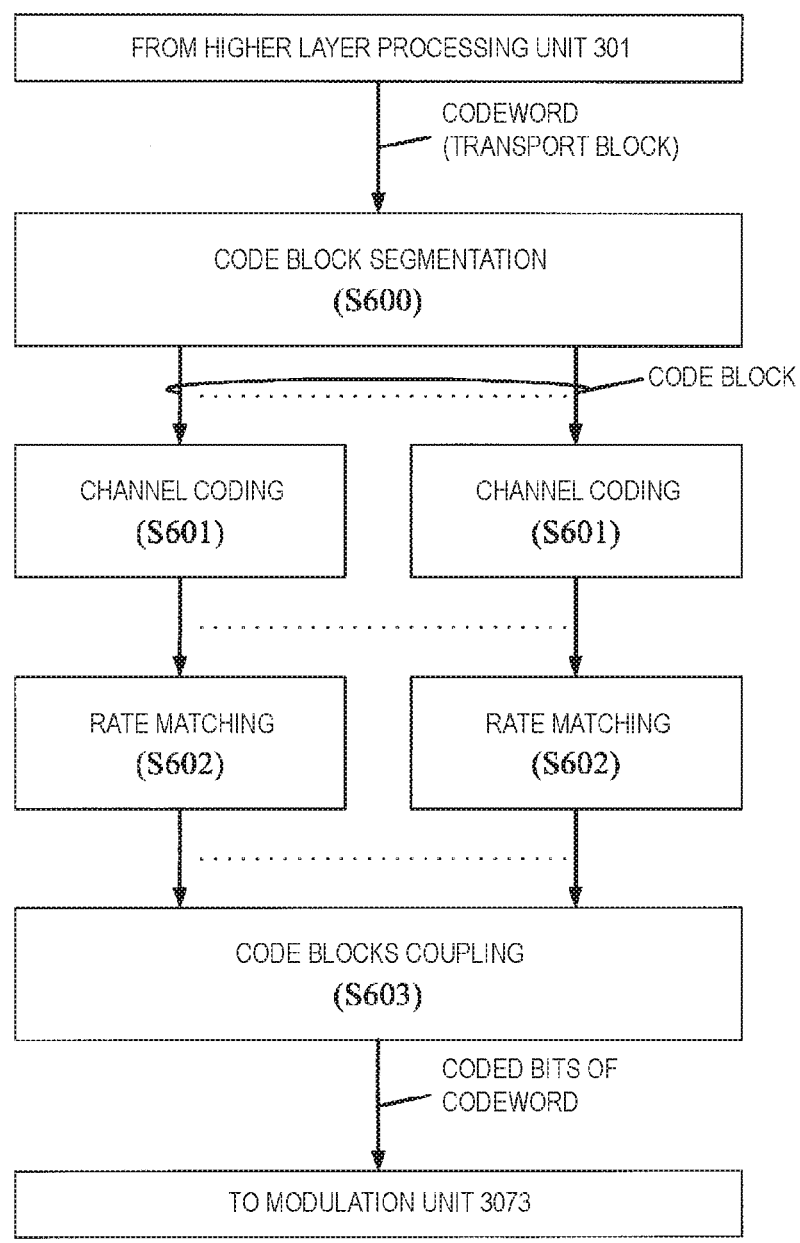
FIG. 6 is a diagram illustrating an example of processing in a coding unit 3071 according to the present embodiment.

FIG. 6 is a diagram illustrating an example of processing in the coding unit 3071 according to the present embodiment. The coding unit 3071 may apply the processing in FIG. 6 to each transport block. One transport block is mapped to one codeword. To be more specific, coding the transport block is the same as cording the codeword.

The coding unit 3071 attaches, to one codeword input from the higher layer processing unit 301, the corresponding CRC parity bits, and thereafter, segments the codeword into one or multiple code blocks (S600). To each of the code blocks, the corresponding CRC parity bits may be attached.

Each of one or multiple code blocks is coded (e.g., with turbo coding or convolutional coding) (S601). The rate matching is applied to each of sequences of the coded bits of the code block (S602). The sequence of the coded bits of the codeword is obtained by coupling one or multiple code blocks to which the rate matching is applied (S603). The sequence of the coded bits of the codeword is output to the modulation unit 3073.

Figure 7:
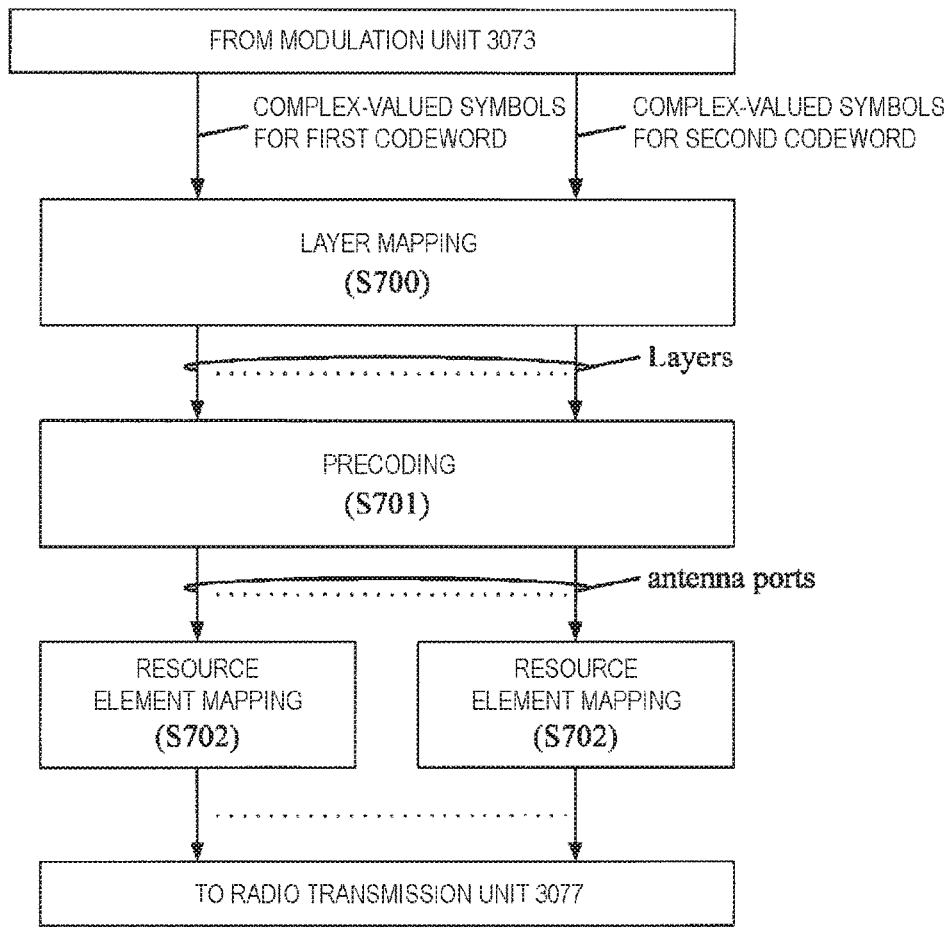
FIG. 7 is a diagram illustrating an example of processing in a multiplexing unit 3075 according to the present embodiment.

FIG. 7 is a diagram illustrating an example of processing in the multiplexing unit 3075 according to the present embodiment. The multiplexing unit 3075 maps complex-valued symbols for a first codeword and complex-valued symbols for a second codeword which are input from the modulation unit 3073 to one or multiple layers (S700). The complex-valued symbols for the first codeword only may be input from the modulation unit 3073. The number of input codewords is the same as or smaller than the number of layers.

The precoding is applied to the complex-valued symbols mapped to the layer (S701). The same number of sequences of the complex-valued symbols as the number of corresponding transmit antenna ports are generated by the precoding. The number of layers is the same as or smaller than the number of transmit antenna ports corresponding to the transmission on the PDSCH. For each transmit antenna port corresponding to the transmission on the PDSCH, the complex-valued symbols to which the precoding is applied are mapped to the resource element (S702).

The terminal device 1 configures a transmission mode for the PDSCH transmission, based on the information received from the base station device 3. The terminal device 1 is configured by a higher layer to receive PDSCH data transmission signaled through the PDCCH depending on the transmission mode. The terminal device 1 selects a DCI format to monitor depending on the transmission mode. The terminal device 1 also specifies the transmission scheme of PDSCH corresponding to the DCI format depending on the transmission mode and the received DCI format.

FIG. 8 is a diagram illustrating an example of correspondence among the transmission mode, the DCI format, and the transmission scheme of PDSCH according to the present embodiment. A column of P800 in FIG. 8 lists the transmission mode. A column of P801 in FIG. 8 lists the DCI format. A column of P802 in FIG. 8 lists the transmission scheme of PDSCH corresponding to the PDCCH, and the number of layers supported by the transmission scheme of PDSCH. For example, in FIG. 8, in a case that the terminal device 1 is configured with transmission mode 4 and receives DCI format 2 on the PDCCH, the transmission scheme of PDSCH corresponding to the PDCCH is closed-loop spatial-multiplexing (up to 4 layers) or transmit diversity (1 layer). Information included in DCI format 2 indicates any one of the closed-loop spatial-multiplexing and the transmit diversity. The information included in DCI format 2 also indicates the number of layers to be spatial-multiplexed.

The terminal device 1 transmits capability information (UECapabilityInformation) to the base station device 3. The base station device 3 configures the terminal device 1 depending on the capability information to schedule the terminal device 1. The capability information (UECapabilityInformation) includes a parameter UE-EUTRA-Capability. In the present embodiment, information/parameters included in the capability information (UECapabilityInformation) is included in the parameter UE-EUTRA-Capability.

The capability information may include multiple capability parameters (UE radio access capability parameters). One capability parameter corresponds to one function or one function group. One capability parameter may indicate whether the corresponding function or the corresponding function group is successfully tested. One capability parameter may indicate whether the terminal device 1 supports the corresponding function or the corresponding function group. The capability information is information about the RRC layer. The capability parameter is the parameter of the RRC layer.

The capability information may include one or multiple capability parameters indicating a UE category. The capability information may include one capability parameter indicating a downlink UE category. In the present embodiment, the downlink UE category is defined separately from the UE category. The UE category and the downlink UE category correspond to a total number of DL-SCH soft channel bits and a maximum number of supported layers for spatial-multiplexing in the downlink. The total number of DL-SCH soft channel bits is the total number of DL-SCH soft channel bits available for HARQ processing.

FIG. 9 is a diagram illustrating an example of the UE category according to the present embodiment. A column of P900 in FIG. 9 lists the capability parameter indicating the UE category. A column of P901 in FIG. 9 lists the UE category indicated by the capability parameter. P902 in FIG. 9 lists a total number of DL-SCH soft channel bits corresponding to the UE category. P903 in FIG. 9 lists a maximum number of supported layers for spatial-multiplexing in the downlink corresponding to the UE category. A capability parameter ue-Category (without suffix) indicates any one of UE categories 1 to 5. A capability parameter ue-Category-v1020 indicates any one of UE categories 6 to 8. A capability parameter ue-Category-v1170 indicates any one of UE categories 9 and 10. A capability parameter ue-Category-v11a0 indicates any one of UE categories 11 and 12.

FIG. 10 is a diagram illustrating an example of the downlink UE category according to the present embodiment. A column of P1000 in FIG. 10 lists the capability parameter indicating the downlink UE category. A column of P1001 in FIG. 10 lists the downlink UE category indicated by the capability parameter. P1002 in FIG. 10 lists a total number of DL-SCH soft channel bits corresponding to the downlink UE category. P1003 in FIG. 10 lists a maximum number of supported layers for spatial-multiplexing in the downlink corresponding to the downlink UE category. A capability parameter ue-CategoryDL-r12 indicates any one of downlink UE categories 0, 6, 7, 9, 10, 11, 12, 13, and 14.

FIG. 11 is a diagram illustrating an example of a combination of categories indicated by multiple capability parameters according to the present embodiment. Case 9 in FIG. 11 expresses that in a case that the capability parameter ue-CategoryDL-r12 indicates downlink UE category 9, the capability parameter ue-Category-v1020 indicates UE category 6, and the capability parameter ue-Category (without suffix) indicates the UE category 4.

The capability information may include a capability parameter supportedBandCombination indicating the carrier aggregation and MIMO supported by the terminal device 1. The capability parameter supportedBandCombination indicates one or multiple band combinations. The one band combination includes one or multiple bands. The one band includes one or multiple combinations of the supported bandwidth class and MIMO capability for the downlink. To be more specific, for each of the bandwidth classes for each band in a band combination specified in the capability parameter supportedBandCombination, the terminal device 1 provides the base station device 3 with the MIMO capability for the downlink. The MIMO capability for the downlink indicates a maximum number of layers supported by the terminal device 1 and is applied to all the component carriers (cells) corresponding to the bandwidth class.

The bandwidth class corresponds to the aggregated transmission bandwidth configuration and number of component carriers supported for the bandwidth class by the terminal device 1. The aggregated transmission bandwidth configuration is defined by a total number of resource blocks included in the component carriers aggregated in the corresponding band. Multiple component carriers corresponding to the bandwidth class are continuous in the frequency domain. There may be a guard band of 300 kHz or less between the component carriers continuous in the frequency domain. In a case that the number of component carriers corresponding to the bandwidth class is two, two component carriers continuous in the frequency domain is supported by the terminal device 1. There may be a guard band of the same as or smaller than a predetermined value between the two continuous component carriers. Here, the predetermined value may be 300 KHz.

FIG. 12 is a diagram illustrating an example of the bandwidth class according to the present embodiment. In FIG. 12, in a case that the bandwidth class is C, the aggregated transmission bandwidth configuration is more than 25 and equal to or less than 100, and the maximum number of component carriers is 2.

Figure 13:
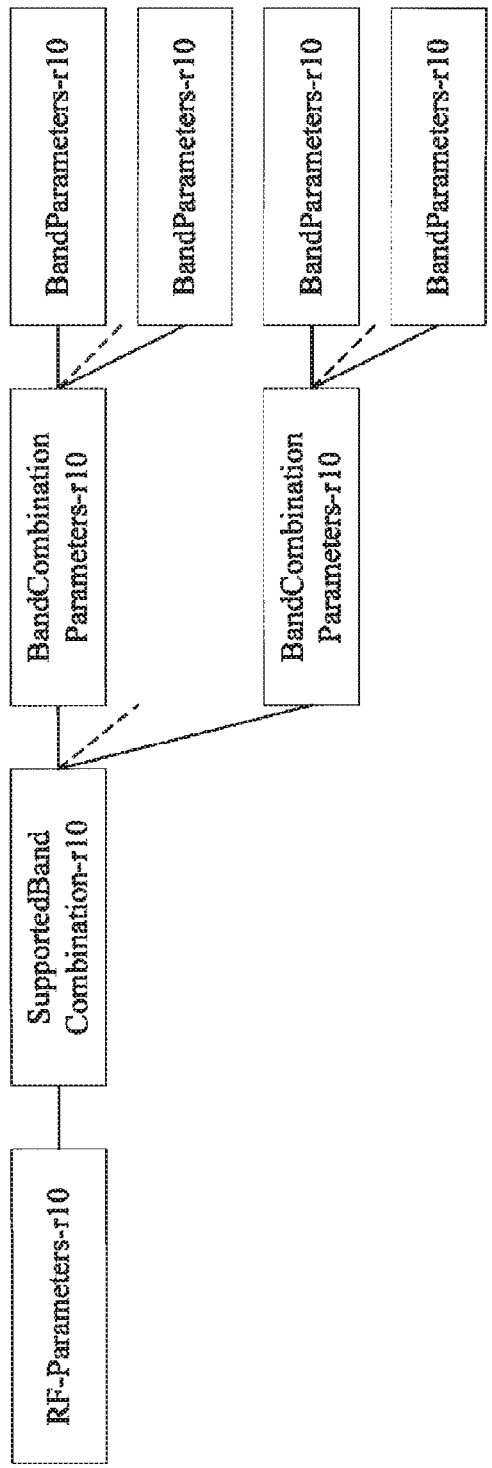
FIG. 13 is a diagram illustrating an example of a configuration of a capability parameter supportedBandCombination according to the present embodiment.
Figure 14:
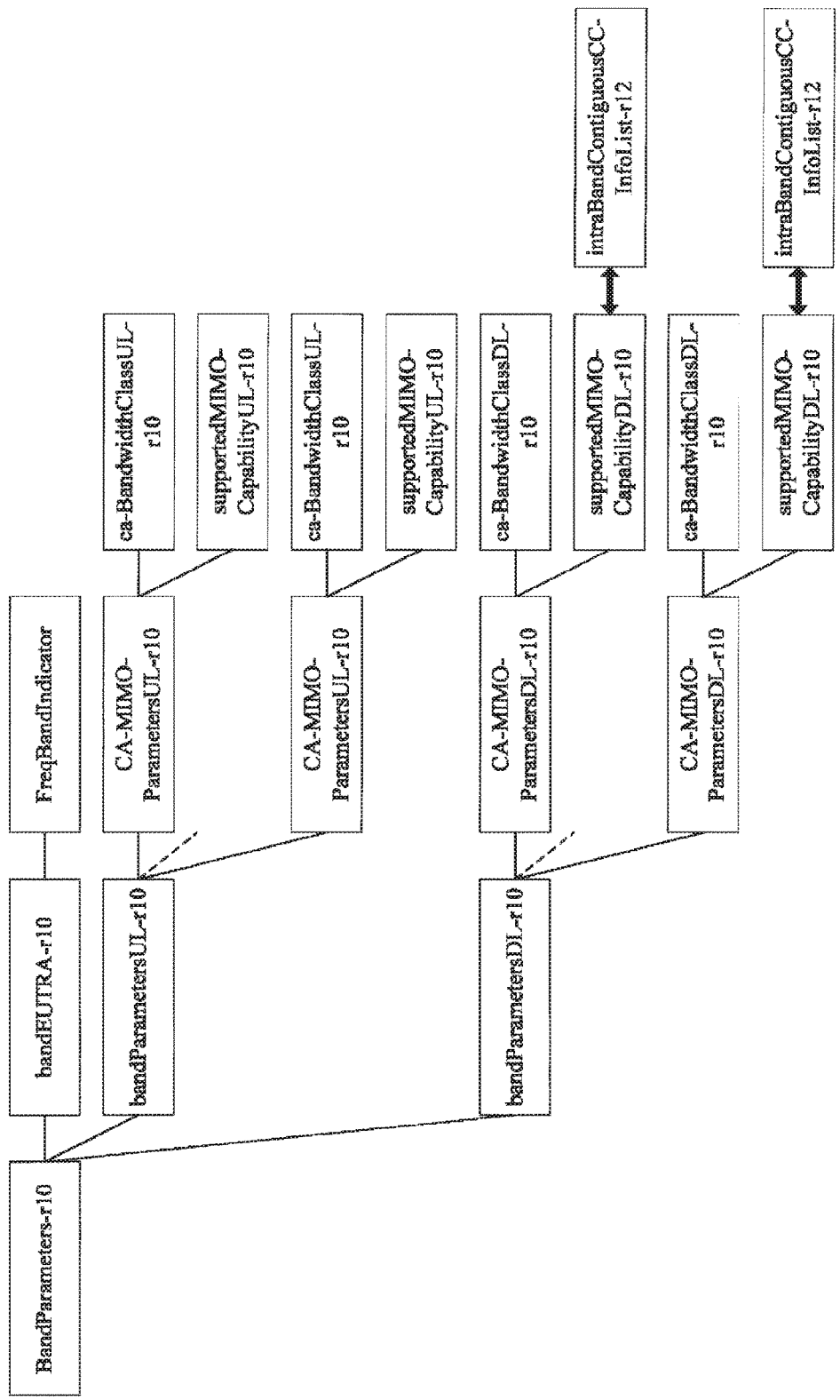
FIG. 14 is a diagram illustrating an example of a configuration of a capability parameter supportedBandCombination according to the present embodiment.

Each of FIG. 13 and FIG. 14 is a diagram illustrating an example of a configuration of the capability parameter supportedBandCombination according to the present embodiment. The capability parameter supportedBandCombination is included in a capability parameter RF-Parameters-r10. The capability parameter supportedBandCombination includes one or multiple parameters BandCombinationParameters-r10. The capability parameter supportedBandCombination indicates a band combination. The parameter BandCombinationParameters-r10 includes one or multiple parameters BandParameters-r10. The parameter BandParameters-r10 indicates one band.

A parameter FreqBandIndicator included in the parameter BandParameters-r10 indicates a frequency of the corresponding band. A parameter bandParametersUL-r10 included in the parameter BandParameters-r10 includes one or multiple parameters CA-MIMO-ParametersUL-r10. The parameter CA-MIMO-ParametersUL-r10 includes a parameter ca-BandwidthClassUL-r10 and a parameter supported-MIMO-CapabilityUL-r10. The parameter ca-BandwidthClassUL-r10 indicates a bandwidth class for the uplink in the corresponding band. The parameter supportedMIMO-CapabilityUL-r10 indicates the MIMO capability for the uplink in the corresponding band (the maximum number of layers supported by the terminal device 1). To be more specific, the parameter ca-BandwidthClassUL-r10 indicates one combination of the bandwidth class and the MIMO capability for the uplink.

A parameter bandParametersDL-r10 included in the parameter BandParameters-r10 includes one or multiple parameters CA-MIMO-ParametersDL-r10. The parameter CA-MIMO-ParametersDL-r10 includes a parameter ca-BandwidthClassDL-r10 and a parameter supported-MIMO-CapabilityDL-r10. The parameter ca-BandwidthClassDL-r10 indicates a bandwidth class for the downlink in the corresponding band. The parameter supportedMIMO-CapabilityDL-r10 indicates the MIMO capability for the downlink in the corresponding band (the maximum number of layers supported by the terminal device 1). To be more specific, the parameter ca-BandwidthClassDL-r10 indicates one combination of the bandwidth class and the MIMO capability for the downlink.

The capability parameter supportedBandCombination may indicate the MIMO capability without the carrier aggregation (the maximum number of layers supported by the terminal device 1).

For each of the bandwidth classes for each band in a band combination specified in the capability parameter supportedBandCombination, the terminal device 1 further provides the base station device with a parameter intraBandContiguousCC-InfoList-r12 including one or multiple parameters IntraBandContiguousCC-Info-r12. The number of parameters IntraBandContiguousCC-Info-r12 included in the parameter intraBandContiguousCC-InfoList-r12 is the same as the number of component carriers corresponding to the bandwidth class corresponding to the parameter intraBandContiguousCC-InfoList-r12.

The parameter IntraBandContiguousCC-Info-r12 includes a parameter supportedMIMO-CapabilityDL-r12. The parameter supportedMIMO-CapabilityDL-r12 included in the parameter intraBandContiguousCC-InfoList-r12 indicates the maximum number of layers supported by the terminal device 1, and indicates the MIMO capability applied to any one of the downlink component carriers corresponding to the bandwidth class.

The parameter supportedMIMO-CapabilityDL-r10 and the parameter supportedMIMO-CapabilityDL-r12 may be applied to transmission mode 9 and transmission mode 10. The parameter supportedMIMO-CapabilityDL-r10 and the parameter supportedMIMO-CapabilityDL-r12 may not be applied to transmission mode 3 and transmission mode 4.

The parameter IntraBandContiguousCC-Info-r12 may include a parameter fourLayerTM3-TM4-perCC-r12. The parameter fourLayerTM3-TM4-perCC-r12 indicates that four layers are supported for TM3 and TM4 by the terminal device 1 and is applied to any one of the downlink component carriers corresponding to the bandwidth class.

The parameter IntraBandContiguousCC-Info-r12 may include a parameter supportedCSI-Proc-r12. The parameter supportedCSI-Proc-r12 indicates the number of CSI processes supported by the terminal device 1 and is applied to any one of the downlink component carriers corresponding to the bandwidth class.

To be more specific, the parameter IntraBandContiguousCC-Info-r12 is applied to any one of the downlink component carriers corresponding to the bandwidth class. The parameter IntraBandContiguousCC-Info-r12 may indicate a maximum number of layers supported for transmission mode 9 and transmission mode 10 by the terminal device 1, the number of CSI processes supported by the terminal device 1, and whether four layers are supported for TM3 and TM4 by the terminal device 1.

To be more specific, for each of the bandwidth classes (parameter ca-BandwidthClassDL-r10) for each band in a band combination specified in the capability parameter supportedBandCombination, the terminal device 1 provides the base station device 3 with the MIMO capability for the downlink (parameter supportedMIMO-CapabilityDL-r10) applied to all of the downlink component carriers corresponding to the bandwidth class, and the MIMO capability (parameter IntraBandContiguousCC-Info-r12) applied to each of the downlink component carriers corresponding to the bandwidth class. The parameter intraBandContiguousCC-InfoList-r12 may not be included in the capability parameter supportedBandCombination.

FIG. 15 is a diagram illustrating an example of the combination of the bandwidth class and MIMO capability according to the present embodiment. The terminal device 1 may provide the base station device 3 with four combinations illustrated in FIG. 15 for one band in one band combination specified in the capability parameter supportedBandCombination. In FIG. 15, in a case that the bandwidth class is B, the parameter supportedMIMO-CapabilityDL-r10 indicates 2, and the parameter intraBandContiguousCC-InfoList-r12 indicates {4, 2}.

In FIG. 15, the base station device 3 incapable of reading the parameter intraBandContiguousCC-InfoList-r12 determines that the maximum number of layers supported in each of the two downlink component carriers (two cells) configured for the corresponding band is two.

In FIG. 15, the base station device 3 capable of reading the parameter intraBandContiguousCC-InfoList-r12 determines that the maximum number of layers supported in one of two downlink component carriers (two cells) configured for the corresponding band is four, and the maximum number of layers supported in the other of two downlink component carriers is two.

Hereinafter, assume that in the description for FIG. 15, the terminal device 1 is configured with two downlink component carriers for one band. Here, which of the two downlink component carriers the PDSCH (DL-SCH) transmission using up to four layers is applied to may be controlled by the base station device 3. The base station device 3 may be applied only to a first downlink component carrier that is one of the two downlink component carriers to transmit a parameter maxLayersMIMO-r10 indicating the maximum number of layers to the terminal device 1. The base station device 3 may be applied only to a second downlink component carrier that is one of the two downlink component carriers to transmit a parameter MaxLayersMIMO-r10 indicating the maximum number of layers to the terminal device 1. The parameter MaxLayersMIMO-r10 is a parameter of the RRC layer.

For example, in FIG. 15, the base station device 3 may transmit to the terminal device 1 the parameter MaxLayersMIMO-r10 for the first downlink component carrier that is one of the two downlink component carriers for which the parameter MaxLayersMIMO-r10 indicate 4, and the parameter MaxLayersMIMO-r10 for the second downlink component carrier that is one of the two downlink component carriers for which the parameter MaxLayersMIMO-r10 indicate 2.

For example, in FIG. 15, in a case that the parameter MaxLayersMIMO-r10 for the first downlink component carrier that is one of the two downlink component carriers is received/configured, the terminal device 1 may determine that up to four layers indicated by the parameter MaxLayersMIMO-r10 are applied to the PDSCH (DL-SCH) transmission in the first downlink component carrier that is one of the two downlink component carriers.

For example, in FIG. 15, in a case that the parameter MaxLayersMIMO-r10 for the second downlink component carrier that is one of the two downlink component carriers is not received/configured, the terminal device 1 may determine that up to two layers indicated by the parameter supportedMIMO-CapabilityDL-r10 are applied to the PDSCH (DL-SCH) transmission in the second downlink component carrier that is one of the two downlink component carriers.

For example, in FIG. 15, in a case that the capability information does not include the parameter supportedMIMO-CapabilityDL-r10 and the parameter intraBandContiguousCC-InfoList-r12, the terminal device 1 may determine that up to the maximum number of layers corresponding to the capability parameter ue-Category (without suffix) are applied to the PDSCH (DL-SCH) transmission in the first downlink component carrier that is one of the two downlink component carriers.

The parameter MaxLayersMIMO-r10 may be configured for each serving cell. One parameter MaxLayersMIMO-r10 for a certain serving cell may be applied to each of multiple CSI processes in the certain serving cell. One parameter MaxLayersMIMO-r10 for a certain serving cell may be applied to each of multiple NZP CSI-RS resources in the certain serving cell. One parameter MaxLayersMIMO-r10 for a certain serving cell may be applied to each of multiple NZP CSI-RS resources corresponding to one CSI process in the certain serving cell. The NZP CSI-RS resource is a resource on which the NZP CSI-RS is transmitted.

The parameter MaxLayersMIMO-r10 may be configured for each CSI process. One parameter MaxLayersMIMO-r10 for a certain CSI process in a certain serving cell may be applied to each of multiple NZP CSI-RS resources corresponding to the certain CSI process in the certain serving cell. The parameter MaxLayersMIMO-r10 configured for each CSI process may be referred to as a parameter MaxLayersMIMO-r11.

The parameter MaxLayersMIMO-r10 may be configured for each NZP CSI-RS resource in a certain serving cell and/or a certain CSI process. The parameter MaxLayersMIMO-r10 configured for each NZP CSI-RS resource may be referred to as a parameter MaxLayersMIMO-r13.

Figure 16:
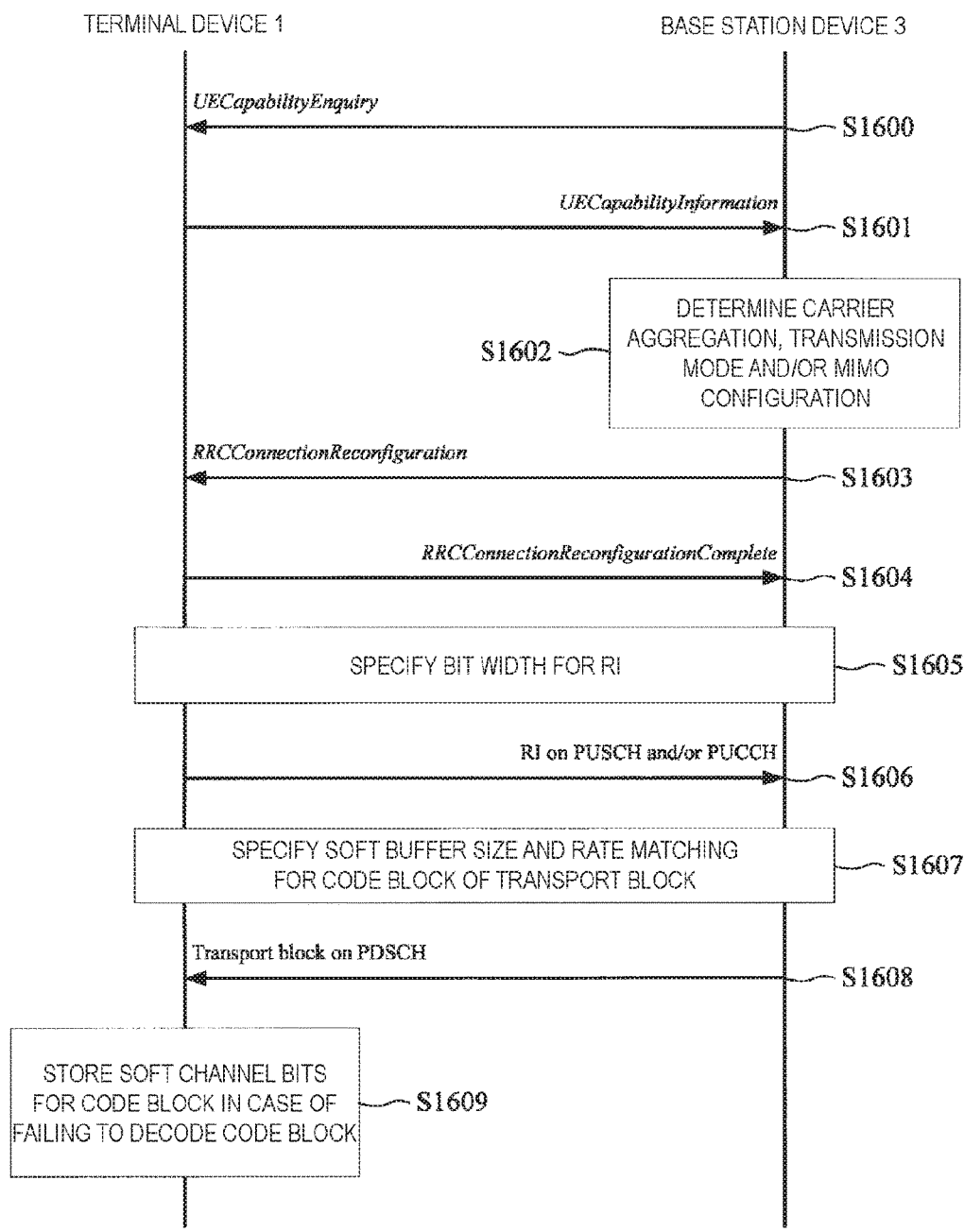
FIG. 16 is a diagram illustrating an example of a sequence chart between the terminal device 1 and the base station device 3 according to the present embodiment.

FIG. 16 is a diagram illustrating an example of a sequence chart between the terminal device 1 and the base station device 3 according to the present embodiment.

The base station device 3 transmits a UECapabilityEnquiry message to the terminal device 1 (S1600). The UECapabilityEnquiry message is a message of the RRC layer. The UECapabilityEnquiry message is used to request deliver of the capability information (UECapabilityInformation). In a case that the terminal device 1 receives the UECapabilityEnquiry message, the terminal device 1 transmits the capability information (UECapabilityInformation) to the base station device 3 (S1601).

In accordance with the received capability information (UECapabilityInformation), the base station device 3 determines the carrier aggregation for the terminal device 1, the transmission mode for the PDSCH transmission, and/or MIMO configuration for the PDSCH transmission (S1602).

The base station device 3 transmits a RRCConnectionReconfiguration message to the terminal device 1 (S1603). The RRCConnectionReconfiguration message delivers the information of the RRC layer for the configuration determined at S1602. The RRCConnectionReconfiguration message is a command for correcting RRC connection. The RRCConnectionReconfiguration message may include the parameter MaxLayersMIMO-r10.

The terminal device 1 corrects/re-configures the RRC connection depending on the received RRCConnectionReconfiguration message. To be more specific, the terminal device 1 corrects/re-configures the carrier aggregation, the transmission mode for the PDSCH transmission, and/or the MIMO for the PDSCH transmission depending on the received RRCConnectionReconfiguration message. The terminal device 1 transmits a RRCConnectionReconfigurationComplete message to the base station device 3, after correcting the RRC connection depending on the received RRCConnectionReconfiguration message. The RRCConnectionReconfigurationComplete message is a message of the RRC layer. The RRCConnectionReconfigurationComplete message is used to confirm successful completion of the RRC connection re-configuration.

The terminal device 1 and the base station device 3 specify a RI bit width, based on the configuration determined at S1602 and/or the capability information (UECapabilityInformation) (S1605). The terminal device 1 transmits an RI of the bit width determined at S1605 to the base station device 3 on the PUCCH or PUSCH (S1606). The base station device 3 assumes the RI of the bit width determined at S1605 to perform reception processing (de-multiplexing, demodulating, and/or decoding) of the RI (S1606).

The RI bit width is provided for each corresponding downlink component carrier (cell), for each corresponding CSI process, for each corresponding NZP CSI-RS resource. The RI bit widths corresponding to the different downlink component carriers/different CSI processes/different NZP CSI-RS resources may be different from each other. In a case that the maximum number of layers for the downlink (PDSCH) in the corresponding downlink component carrier/CSI process/NZP CSI-RS resource is two, the RI bit width is "1". In a case that the maximum number of layers for the downlink (PDSCH) in the corresponding downlink component carrier/CSI process/NZP CSI-RS resource is four, the RI bit width is "2". In a case that the maximum number of layers for the downlink (PDSCH) in the corresponding downlink component carrier/CSI process/NZP CSI-RS resource is eight, the RI bit width is "3".

On the basis of the configuration determined at S1602 and/or the capability information (UECapabilityInformation), the terminal device 1 and the base station device 3 specify a soft buffer size for the code block of the transport block (codeword) transmitted on the PDSCH and the rate matching for the code block (S1607).

The base station device 3 codes the transport block depending on the rate matching for the code block of the transport block specified at S1607 and transmits the coded transport block on the PDSCH to the terminal device 1 (S1608). The terminal device 1 performs reception processing on (decodes) the transport block depending on the rate matching for the code block of the transport block specified at S1607.

In a case that the terminal device 1 fails to decode the code block of the transport block, the terminal device 1 stores some or all of the soft channel bits for the code block (S1609). Which of the soft channel bits for the code block is stored is provided by referring to the soft buffer size for the code block of the transport block specified at S1607. The stored soft channel bits are used for the HARQ processing on the code block. The stored soft channel bits and the re-transmitted soft channel bits may be synthesized.

Hereinafter, a description is given of a first example of a method of specifying the bit width for the RI at step S1605 in FIG. 16. The first example applies to the terminal device 1.

(1-1) In the first example, the terminal device 1 includes the transmission unit 107 and the reception unit 105. The transmission unit 107 transmits a Rank Indicator (RI), and the RI corresponds to Physical Downlink Shared CHannel (PDSCH) transmission in a first downlink component carrier for a first bandwidth class of a first band in a first band combination and corresponds to the number of layers. The RI is determined by the terminal device, and the reception unit 105 receives the PDSCH. Here, the transmission unit 107 transmits the capability information (UECapabilityInformation) including first information (ue-Category (without suffix)), second information (ca-BandwidthClassDL-r10), third information (supportedMIMO-CapabilityDL-r10), and/or fourth information (intraBandContiguousCC-Info-List-r12). Here, the reception unit 105 receives fifth information (MaxLayersMIMO-r10) for the first downlink component carrier corresponding to the first bandwidth class of the first band in the first band combination. Here, the first information (ue-Category (without suffix)) indicates the UE category corresponding to a first maximum number of the layers supported by the terminal device in the downlink. Here, the second information (ca-BandwidthClassDL-r10) indicates the first bandwidth class for the first band in the first band combination, the first bandwidth class corresponding to the number of downlink component carriers supported by the terminal device. Here, the third information (supportedMIMO-CapabilityDL-r10) is applied to one or all of multiple downlink component carriers corresponding to the first bandwidth class of the first band in the first band combination, and indicates a second maximum number of the layers supported by the terminal device in the downlink. Here, the fourth information (intraBandContiguousCC-InfoList-r12) is applied to any one of one or multiple downlink component carriers corresponding to the first bandwidth class of the first band in the first band combination, and indicates a third maximum number of the layers supported by the terminal device in the downlink. Here, the fifth information (MaxLayersMIMO-r10) indicates a fourth maximum number of the layers. Here, a fifth maximum number of the layers assumed for determining the bit width for an RI is provided by referring to any one of the first maximum number of the layers, the second maximum number of the layers, and the fourth maximum number of the layers, based on whether the fifth information for the first downlink component carrier corresponding to the first bandwidth class of the first band in the first band combination is configured. Here, the bit width for the RI is provided by referring to the fifth maximum number of the layers.

(1-2) In the first example, in a case that the fifth information (MaxLayersMIMO-r10) for the first downlink component carrier corresponding to the first bandwidth class of the first band in the first band combination is not configured, the fifth maximum number of the layers assumed for determining the bit width for the RI is provided by referring to any one of the first maximum number of the layers and the second maximum number of the layers. Here, in a case that the fifth information (MaxLayersMIMO-r10) for the first downlink component carrier corresponding to the first bandwidth class of the first band in the first band combination is configured, the fifth maximum number of the layers assumed for determining the bit width for the RI is provided by referring to the fourth maximum number of the layers.

(1-3) In the first example, in a case that the fifth information (MaxLayersMIMO-r10) for the first downlink component carrier corresponding to the first bandwidth class of the first band in the first band combination is configured, and a first transmission mode for the PDSCH transmission (e.g., transmission mode 9) is configured for the first downlink component carrier, the fifth maximum number of the layers assumed for determining the bit width for the RI is determined according to the smallest one of (i) the number of first ports configured and (ii) the third maximum number of the layers. Here, the first port is a transmit antenna port for the Channel State Information-Reference Signal (CSI-RS).

(1-4) In the first example, in a case that the fifth information (MaxLayersMIMO-r10) for the first downlink component carrier corresponding to the first bandwidth class of the first band in the first band combination is configured, and a second transmission mode for the PDSCH transmission (e.g., transmission mode 4) is configured for the first downlink component carrier, the fifth maximum number of the layers assumed for determining the bit width for the RI is determined according to the smallest one of (i) the number of second ports and (ii) the third maximum number of the layers. Here, the second port is a transmit antenna port for the Physical Broadcast CHannel (PBCH).

(1-5) In the first example, in a case that the fifth information (MaxLayersMIMO-r10) for the first downlink component carrier corresponding to the first bandwidth class of the first band in the first band combination is not configured, the first transmission mode for the PDSCH transmission (e.g., transmission mode 9) is configured for the first downlink component carrier, and the capability information (UECapabilityInformation) includes the third information (supportedMIMO-CapabilityDL-r10), the fifth maximum number of the layers assumed for determining the bit width for the RI is determined according to the smallest one of (i) the number of first ports configured and (ii) the second maximum number of the layers. Here, the first port is a transmit antenna port for the Channel State Information-Reference Signal (CSI-RS).

(1-6) In the first example, in a case that the fifth information (MaxLayersMIMO-r10) for the first downlink component carrier corresponding to the first bandwidth class of the first band in the first band combination is not configured, the first transmission mode for the PDSCH transmission (e.g., transmission mode 9) is configured for the first downlink component carrier, and the capability information (UECapabilityInformation) does not include the third information (supportedMIMO-CapabilityDL-r10), the fifth maximum number of the layers assumed for determining the bit width for the RI is determined according to the smallest one of (i) the number of first ports configured and (ii) the first maximum number of the layers. Here, the first port is a transmit antenna port for the Channel State Information-Reference Signal (CSI-RS).

(1-7) In the first example, in a case that the fifth information (MaxLayersMIMO-r10) for the first downlink component carrier corresponding to the first bandwidth class of the first band in the first band combination is not configured, and the second transmission mode for the PDSCH transmission (e.g., transmission mode 4) is configured for the first downlink component carrier, the fifth maximum number of the layers assumed for determining the bit width for the RI is determined according to the smallest one of (i) the number of second ports and (ii) the first maximum number of the layers. Here, the second port is a transmit antenna port for the Physical Broadcast CHannel (PBCH).

(1-8) In the first example, the transmission unit 107 transmits an RI on a Physical Uplink Shared CHannel (PUSCH).

Hereinafter, a description is given of a second example of the method of specifying the bit width for the RI at step S1605 in FIG. 16. The second example applies to the base station device 3.

(2-1) In the second example, the base station device 3 includes the reception unit 305 and the transmission unit 307. The reception unit 305 receives a Rank Indicator (RI) from a terminal device, the RI corresponds to Physical Downlink Shared CHannel (PDSCH) transmission in a first downlink component carrier for a first bandwidth class of a first band in a first band combination and corresponds to the number of layers, the RI is determined by the terminal device, and the transmission unit 307 transmits the PDSCH to the terminal device. Here, the reception unit 305 receives from the terminal device the capability information (UECapabilityInformation) including first information (ue-Category (without suffix)), second information (ca-BandwidthClassDL-r10), third information (supportedMIMO-CapabilityDL-r10), and/or fourth information (intraBandContiguousCC-InfoList-r12). Here, the transmission unit 307 transmits to the terminal device fifth information (MaxLayersMIMO-r10) for the first downlink component carrier corresponding to the first bandwidth class of the first band in the first band combination. Here, the first information (ue-Category (without suffix)) indicates the UE category corresponding to a first maximum number of the layers supported by the terminal device in the downlink. Here, the second information (ca-BandwidthClassDL-r10) indicates the first bandwidth class for the first band in the first band combination, the first bandwidth class corresponding to the number of downlink component carriers supported by the terminal device. Here, the third information (supportedMIMO-CapabilityDL-r10) is applied to one or all of multiple downlink component carriers corresponding to the first bandwidth class of the first band in the first band combination, and indicates a second maximum number of the layers supported by the terminal device in the downlink. Here, the fourth information (intraBandContiguousCC-InfoList-r12) is applied to any one of one or multiple downlink component carriers corresponding to the first bandwidth class of the first band in the first band combination, and indicates a third maximum number of the layers supported by the terminal device in the downlink. Here, the fifth information (MaxLayersMIMO-r10) indicates a fourth maximum number of the layers. A fifth maximum number of the layers assumed for determining the bit width for the RI is provided by referring to any one of the first maximum number of the layers, the second maximum number of the layers, and the fourth maximum number of the layers, based on whether the terminal device is configured with the fifth information (MaxLayersMIMO-r10) for the first downlink component carrier corresponding to the first bandwidth class of the first band in the first band combination.

(2-2) In the second example, in a case that the terminal device is not configured with the fifth information (MaxLayersMIMO-r10) for the first downlink component carrier corresponding to the first bandwidth class of the first band in the first band combination, the fifth maximum number of the layers assumed for determining the bit width for the RI is provided by referring to any one of the first maximum number of the layers and the second maximum number of the layers. Here, in a case that the terminal device is configured with the fifth information (MaxLayersMIMO-r10) for the first downlink component carrier corresponding to the first bandwidth class of the first band in the first band combination, the fifth maximum number of the layers assumed for determining the bit width for the RI is provided by referring to the fourth maximum number of the layers.

(2-3) In the second example, in a case that the terminal device is configured with the fifth information (MaxLayersMIMO-r10) for the first downlink component carrier corresponding to the first bandwidth class of the first band in the first band combination, and the terminal device is configured with a first transmission mode for the PDSCH transmission (e.g., transmission mode 9) for the first downlink component carrier, the fifth maximum number of the layers assumed for determining the bit width for the RI is determined according to the smallest one of (i) the number of first ports configured and (ii) the third maximum number of the layers. Here, the first port is a transmit antenna port for the Channel State Information-Reference Signal (CSI-RS).

(2-4) In the second example, in a case that the terminal device is configured with the fifth information (MaxLayersMIMO-r10) for the first downlink component carrier corresponding to the first bandwidth class of the first band in the first band combination, and the terminal device is configured with the second transmission mode for the PDSCH transmission (e.g., transmission mode 4) for the first downlink component carrier, the fifth maximum number of the layers assumed for determining the bit width for the RI is determined according to the smallest one of (i) the number of second ports and (ii) the third maximum number of the layers. Here, the second port is a transmit antenna port for the Physical Broadcast CHannel (PBCH).

(2-5) In the second example, in a case that the terminal device is not configured with the fifth information (MaxLayersMIMO-r10) for the first downlink component carrier corresponding to the first bandwidth class of the first band in the first band combination, the terminal device is configured with the first transmission mode for the PDSCH transmission (e.g., transmission mode 9) for the first downlink component carrier, and the capability information (UECapabilityInformation) includes the third information (supportedMIMO-CapabilityDL-r10), the fifth maximum number of the layers assumed for determining the bit width for the RI is determined according to the smallest one of (i) the number of first ports configured and (ii) the second maximum number of the layers. Here, the first port is a transmit antenna port for the Channel State Information-Reference Signal (CSI-RS).

(2-6) In the second example, in a case that the terminal device is not configured with the fifth information (MaxLayersMIMO-r10) for the first downlink component carrier corresponding to the first bandwidth class of the first band in the first band combination, the terminal device is configured with the first transmission mode for the PDSCH transmission (e.g., transmission mode 9) for the first downlink component carrier, and the capability information (UECapabilityInformation) does not include the third information (supportedMIMO-CapabilityDL-r10), the fifth maximum number of the layers assumed for determining the bit width for the RI is determined according to the smallest one of (i) the number of first ports configured and (ii) the first maximum number of the layers. Here, the first port is a transmit antenna port for the Channel State Information-Reference Signal (CSI-RS).

(2-7) In the second example, in a case that the terminal device is not configured with the fifth information (MaxLayersMIMO-r10) for the first downlink component carrier corresponding to the first bandwidth class of the first band in the first band combination, and the terminal device is configured with the second transmission mode for the PDSCH transmission (e.g., transmission mode 4) for the first downlink component carrier, the fifth maximum number of the layers assumed for determining the bit width for the RI is determined according to the smallest one of (i) the number of second ports and (ii) the first maximum number of the layers. Here, the second port is a transmit antenna port for the Physical Broadcast CHannel (PBCH).

(2-8) In the second example, the reception unit 305 receives the RI on a Physical Uplink Shared CHannel (PUSCH).

Hereinafter, a description is given of a third example of the method of specifying the bit width for the RI at step S1605 in FIG. 16. The third example applies to the terminal device 1. In the third example, the capability information (UECapabilityInformation) includes the third information (supportedMIMO-CapabilityDL-r10). In the third example, the capability information (UECapabilityInformation) may not include the fourth information (intraBandContiguousCC-InfoList-r12).

(3-1) In the third example, the terminal device 1 includes the transmission unit 107 and the reception unit 105. The transmission unit 107 transmits a Rank Indicator (RI), the RI corresponds to Physical Downlink Shared CHannel (PDSCH) transmission in a downlink component carrier for a first band in a first band combination and corresponds to the number of layers, the RI is determined by the terminal device, and the reception unit 105 receives the PDSCH. Here, a first maximum number of the layers assumed for determining the bit width for the RI is based on the number of downlink component carriers configured in the first band in the first band combination.

(3-2) In the third example, the first band combination includes only the first band.

(3-3) In the third example, the terminal device is configured with transmission mode 9 or 10 for the PDSCH transmission.

(3-4) In the third example, the transmission unit 107 transmits the capability information (UECapabilityInformation) including first information (ca-BandwidthClassDL-r10), second information (supportedMIMO-CapabilityDL-r10), third information (ca-BandwidthClassDL-r10), and fourth information (supportedMIMO-CapabilityDL-r10). Here, the first information (ca-BandwidthClassDL-r10) indicates the first bandwidth class for the first band in the first band combination, the first bandwidth class indicating a first number of downlink component carriers supported by the terminal device. Here, the second information (supportedMIMO-CapabilityDL-r10) is applied to all of the first number of downlink component carriers corresponding to the first bandwidth class of the first band in the first band combination, and indicates a first maximum number of the layers supported by the terminal device in the downlink. Here, the third information (ca-BandwidthClassDL-r10) indicates a second bandwidth class for the first band in the first band combination, the second bandwidth class indicating a second number of downlink component carriers supported by the terminal device. Here, the fourth information (supportedMIMO-CapabilityDL-r10) is applied to all of the second number of downlink component carriers corresponding to the second bandwidth class of the first band in the first band combination, and indicates a second maximum number of the layers supported by the terminal device in the downlink. Here, a third maximum number of the layers assumed for determining the bit width for the RI is provided by referring to any one of the first maximum number of the layers and the second maximum number of the layers, based on which of the first number and the second number the number of downlink component carriers configured in the first band in the first band combination is referenced.

(3-5) In the third example, the transmission unit 107 transmits the RI on a Physical Uplink Shared CHannel (PUSCH).

(3-6) In the third example, in a case that the number of downlink component carriers configured in the first band in the first band combination is the first number, the third maximum number of the layers assumed for determining the bit width for the RI is the first maximum number of the layers. Here, in a case that the number of downlink component carriers configured in the first band in the first band combination is the second number, the third maximum number of the layers assumed for determining the bit width for the RI is the second maximum number of the layers.

Hereinafter, a description is given of a fourth example of the method of specifying the bit width for the RI at step S1605 in FIG. 16. The fourth example applies to the base station device 3. In the fourth example, the capability information (UECapabilityInformation) includes the third information (supportedMIMO-CapabilityDL-r10). In the fourth example, the capability information (UECapabilityInformation) may not include the fourth information (intraBandContiguousCC-InfoList-r12).

(4-1) In the fourth example, the base station device 3 includes the reception unit 305 and the transmission unit 307. The reception unit 305 receives a Rank Indicator (RI) from a terminal device, the RI corresponds to Physical Downlink Shared CHannel (PDSCH) transmission in a downlink component carrier for a first band in a first band combination and corresponds to the number of layers, the RI is determined by the terminal device, and the transmission unit 307 transmits the PDSCH to the terminal device. Here, a first maximum number of the layers assumed for determining the bit width for the RI is based on the number of downlink component carriers configured in the first band in the first band combination with respect to the terminal device.

(4-2) In the fourth example, the first band combination includes only the first band.

(4-3) In the fourth example, the terminal device is configured with transmission mode 9 or 10 for the PDSCH transmission.

(4-4) In the fourth example, the reception unit 305 receives from the terminal device the capability information (UECapabilityInformation) including first information (ca-BandwidthClassDL-r10), second information (supportedMIMO-CapabilityDL-r10), third information (ca-BandwidthClassDL-r10), and fourth information (supportedMIMO-CapabilityDL-r10). Here, the first information (ca-BandwidthClassDL-r10) indicates the first bandwidth class for the first band in the first band combination, the first bandwidth class indicating a first number of downlink component carriers supported by the terminal device. Here, the second information (supportedMIMO-CapabilityDL-r10) is applied to all of the first number of downlink component carriers corresponding to the first bandwidth class of the first band in the first band combination, and indicates a first maximum number of the layers supported by the terminal device in the downlink. Here, the third information (ca-BandwidthClassDL-r10) indicates a second bandwidth class for the first band in the first band combination, the second bandwidth class indicating a second number of downlink component carriers supported by the terminal device. Here, the fourth information (supportedMIMO-CapabilityDL-r10) is applied to all of the second number of downlink component carriers corresponding to the second bandwidth class of the first band in the first band combination, and indicates a second maximum number of the layers supported by the terminal device in the downlink. Here, a third maximum number of the layers assumed for determining the bit width for the RI is provided by referring to any one of the first maximum number of the layers and the second maximum number of the layers, based on which of the first number and the second number the number of downlink component carriers configured in the first band in the first band combination is.

(4-5) In the fourth example, the reception unit 305 receives the RI on a Physical Uplink Shared CHannel (PUSCH).

(4-6) In the fourth example, in a case that the number of downlink component carriers configured in the first band in the first band combination is the first number, the third maximum number of the layers assumed for determining the bit width for the RI is the first maximum number of the layers. Here, in a case that the number of downlink component carriers configured in the first band in the first band combination is the second number, the third maximum number of the layers assumed for determining the bit width for the RI is the second maximum number of the layers.

Hereinafter, a description is given of a fifth example of the method of specifying the bit width for the RI at step S1605 in FIG. 16. The fifth example applies to the terminal device 1 and the base station device 3. FIG. 17 is a diagram illustrating an algorithm/pseudo-code of the fifth example for the method of specifying the bit width for the RI. FIG. 17 includes (1700) to (1708). In the fifth example, if the terminal device 1 is configured with transmission mode 3, 4, or 9 for the serving cell, the parameter MaxLayersMIMO-r10 may be configured for each serving cell. In the fifth example, if the terminal device 1 is configured with transmission mode 10 for the serving cell, the parameter MaxLayersMIMO-r11 may be configured for each CSI process.

(1700): The corresponding bit width for RI feedback for PDSCH transmissions are determined assuming the maximum number of layers determined based on (1701) to (1708).

(1701): If the terminal device 1 is configured with transmission mode 3, 4, or 9 for the serving cell, and the parameter maxLayersMIMO-r10 is configured for the serving cell, the maximum number of layers assumed for determining the bit widths for RI feedback for PDSCH transmissions is determined according to the parameter maxLayersMIMO-r10 configured for the serving cell.

(1702): If the terminal device 1 is configured transmission mode 10 with for the serving cell, and the parameter maxLayersMIMO-r11 is configured for the CSI process for the serving cell, the maximum number of layers assumed for determining the bit widths for RI feedback for PDSCH transmissions is determined according to the parameter maxLayersMIMO-r11 configured for the CSI process for the serving cell.

(1703): If (1701) or (1702) is not met, (1703) is applied. (1703) includes (1704) to (1707).

(1704): If the terminal device 1 is configured with transmission mode 9 for the serving cell, and the parameter supportedMIMO-CapabilityDL-10 is included in the parameter UE-EUTRA-Capability, the maximum number of layers assumed for determining the bit widths for RI feedback for PDSCH transmissions is determined according to smaller one of (i) and (ii).

(1705): If the terminal device 1 is configured with transmission mode 9 for the serving cell, and the parameter supportedMIMO-CapabilityDL-r10 is not included in the parameter UE-EUTRA-Capability, the maximum number of layers assumed for determining the bit widths for RI feedback for PDSCH transmissions is determined according to smaller one of (i) and (iii).

(1706): If the terminal device 1 is configured with transmission mode for the serving cell, and the parameter supportedMIMO-CapabilityDL-r10 is included in the parameter UE-EUTRA-Capability, the maximum number of layers assumed for determining the bit widths for RI feedback for PDSCH transmissions is determined according to smaller one of (ii) and (iv).

(1707): If the terminal device 1 is configured with transmission mode 10 for the serving cell, and the parameter supportedMIMO-CapabilityDL-r10 is not included in the parameter UE-EUTRA-Capability, the maximum number of layers assumed for determining the bit widths for RI feedback for PDSCH transmissions is determined according to smaller one of (iii) and (iv).

(1708): If any of conditions (1701) to (1707) is not met, the maximum number of layers assumed for determining the bit widths for RI feedback for PDSCH transmissions is determined according to smaller one of (ii) and (v).

Hereinafter, a description is given of a sixth example of the method of specifying the bit width for the RI at step S1605 in FIG. 16. The sixth example applies to the terminal device 1 and the base station device 3. FIG. 18 is a diagram illustrating an algorithm/pseudo-code of the sixth example for the method of specifying the bit width for the RI. FIG. 18 includes (1800) to (1808). In the sixth example, if the terminal device 1 is configured with transmission mode 3, 4, 9, or 10 for the serving cell, the parameter MaxLayersMIMO-r10 may be configured for each serving cell.

(1800): The corresponding bit width for RI feedback for PDSCH transmissions are determined assuming the maximum number of layers determined based on (1801) to (1808).

(1801) is the same as (1701). (1803) is the same as (1703). (1804) is the same as (1704). (1805) is the same as (1705). (1806) is the same as (1706). (1807) is the same as (1707). (1808) is the same as (1708).

(1802): If the terminal device 1 is configured with transmission mode 10 for the serving cell, and the parameter maxLayersMIMO-r10 is configured for the serving cell, the maximum number of layers assumed for determining the bit widths for RI feedback for PDSCH transmissions is determined according to smaller one of the maximum number of layers indicated by the parameter maxLayersMIMO-r10 configured for the serving cell and (iv).

(1808): If any of conditions (1801) to (1807) is not met, the maximum number of layers assumed for determining the bit widths for RI feedback for PDSCH transmissions is determined according to smaller one of (ii) and (v).

Here, (i) is the maximum of the configured number of CSI-RS ports for the serving cell. To be more specific, (i) is the maximum of the configured number of one or multiple CSI-RS ports for one or multiple CSI-RS resources for the serving cell.

Here, (ii) is the maximum of the maximum number of layers reported by one or multiple parameters supportedMIMO-CapabilityDL-r10 for the same band in the corresponding band combination.

Here, (iii) is the maximum number of layers corresponding to the UE category indicated by the capability parameter ue-Category (without suffix).

Here, (iv) is the maximum of the configured number of CSI-RS ports for the CSI process. To be more specific, (iv) is the maximum of the configured number of one or multiple CSI-RS ports for one or multiple CSI-RS resources for the CSI process.

Here, (v) is the number of PBCH antenna ports. The PBCH antenna port represents the number of transmit antenna ports used for PBCH transmission.

Hereinafter, a description is given of a sixth example of the method of specifying the bit width for the RI at step S1605 in FIG. 16. The sixth example applies to the terminal device 1.

(6-1) In the sixth example, the terminal device 1 includes the transmission unit 107 configured to transmit a first Rank Indicator (RI) for a first Channel State Information (CSI) process in a first downlink component carrier for a first bandwidth class of a first band in a first band combination and a second RI for the second CSI process in the first downlink component carrier, and the reception unit 105 configured to receive a Physical Downlink Shared CHannel (PDSCH) in the first downlink component carrier, and the first RI and the second RI correspond to transmission on the PDSCH in the first downlink component carrier, and correspond to the number of layers, the transmission unit 107 transmits capability information (UECapabilityInformation) including first information (ue-Category (without suffix)), second information (ca-BandwidthClassDL-r10), and third information (supportedMIMO-CapabilityDL-r10), the reception unit 105 receives fourth information (MaxLayersMIMO-r11) for the first CSI process in the first downlink component carrier and fifth information (MaxLayersMIMO-r11) for the second CSI process, the first information indicates a UE category corresponding to a first maximum number of the layers supported by the terminal device in a downlink, the second information indicates the first bandwidth class corresponding to the number of downlink component carriers supported by the terminal device, the third information is applied to one or all of multiple downlink component carriers corresponding to the first bandwidth class, and indicates a second maximum number of the layers supported by the terminal device in the downlink, the fourth information indicates a third maximum number of the layers for the first CSI process, the fifth information indicates a fourth maximum number of the layers for the second CSI process, a fifth maximum number of the layers assumed for determining a bit width for the first RI is provided by referring to any one of the first maximum number of the layers, the second maximum number of the layers, and the third maximum number of the layers, based on whether the fourth information for the first downlink component carrier is configured, and a sixth maximum number of the layers assumed for determining a bit width for the second RI is provided by referring to any one of the first maximum number of the layers, the second maximum number of the layers, and the fourth maximum number of the layers, based on whether the fifth information for the first downlink component carrier is configured.

Hereinafter, a description is given of a seventh example of the method of specifying the bit width for the RI at step S1605 in FIG. 16. The seventh example applies to the base station device 3.

(7-1) In the seventh example, the base station device 3 includes the reception unit 305 configured to receive a first Rank Indicator (RI) for a first Channel State Information (CSI) process in a first downlink component carrier for a first bandwidth class of a first band in a first band combination and a second RI for the second CSI process in the first downlink component carrier, and the transmission unit 307 configured to transmit a Physical Downlink Shared CHannel (PDSCH) in the first downlink component carrier, and the first RI and the second RI correspond to transmission on the PDSCH in the first downlink component carrier, and correspond to the number of layers, the reception unit 305 receives capability information (UECapabilityInformation) including first information (ue-Category (without suffix)), second information (ca-BandwidthClassDL-r10), and third information (supportedMIMO-CapabilityDL-r10), the transmission unit 307 transmits fourth information (MaxLayersMIMO-r11) for the first CSI process in the first downlink component carrier and fifth information (MaxLayersMIMO-r11) for the second CSI process, the first information indicates a UE category corresponding to a first maximum number of the layers supported by the terminal device in a downlink, the second information indicates the first bandwidth class corresponding to the number of downlink component carriers supported by the terminal device, the third information is applied to one or all of multiple downlink component carriers corresponding to the first bandwidth class, and indicates a second maximum number of the layers supported by the terminal device in the downlink, the fourth information indicates a third maximum number of the layers for the first CSI process, the fifth information indicates a fourth maximum number of the layers for the second CSI process, a fifth maximum number of the layers assumed for determining a bit width for the first RI is provided by referring to any one of the first maximum number of the layers, the second maximum number of the layers, and the third maximum number of the layers, based on whether the fourth information for the first downlink component carrier is configured, and a sixth maximum number of the layers assumed for determining a bit width for the second RI is provided by referring to any one of the first maximum number of the layers, the second maximum number of the layers, and the fourth maximum number of the layers, based on whether the fifth information for the first downlink component carrier is configured.

Hereinafter, a description is given of an example of a method of specifying the rate matching for the code block of the transport block at step S1607 in FIG. 16.

Figure 19:
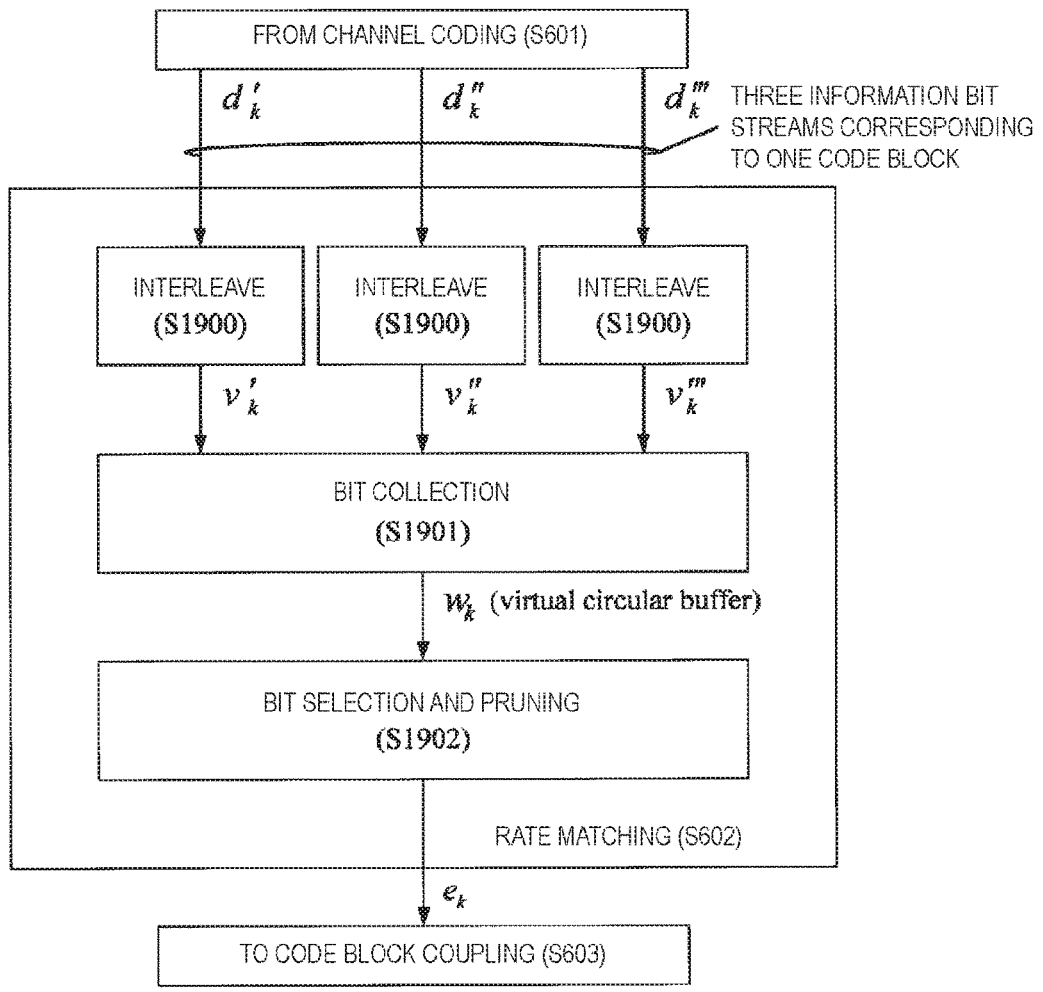
FIG. 19 is a diagram illustrating an example of rate matching according to the present embodiment.

FIG. 19 is a diagram illustrating an example of rate-matching according to the present embodiment. The rate matching is performed at S602 in FIG. 6. To be more specific, the rate matching is applied to the code block of the transport block.

One rate matching (S602) includes three interleaving (S1900), one bit collection (S1901), one bit selection and pruning (S1902). In one rate matching step (S602), three information bit streams (d'$_k$, d"$_k$, d'"$_k$) are input from the channel coding step (S601). Each of three information bit streams (d'$_k$, d"$_k$, d'"$_k$) is interleaved according to a subblock interleaver at interleaving step (S1900). Three output sequences (v'$_k$, v"$_k$, v'"$_k$) are obtained by interleaving each of three information bit streams (d'$_k$, d"$_k$, d'"$_k$).

The number of columns of the subframe interleaver, $C_{subblock}$, is 32. The number of rows of the subblock interleaver, $R_{subblock}$, is the smallest one of integers satisfying Inequality (1) below. Here, D represents the number of bits of each of the information bit streams (d'$_k$, d"$_k$, d'"$_k$).

$$D \le (R_{subblock} \times C_{subblock}) \quad \text{[Equation 1]}$$

The number of bits of each of the output sequences (v'$_k$, v"$_k$, v'"$_k$) of the subframe interleaver, $K_\Pi$, is provided by Equation (2) below.

$$K_\Pi = (R_{subblock} \times C_{subblock}) \quad \text{[Equation 2]}$$

At the bit collection step (S1901), $w_k$ (virtual circular buffer) is obtained from three output sequences (v'$_k$, v"$_k$, v'"$_k$). $w_k$ is provided by Equation (3) below. The number of bits of $w_k$, Kw, is three times $K_\Pi$.

$$w_k = v'_k \text{ for } k=0, \ldots, K_\Pi - 1$$
$$w_{K_\Pi + 2k} = v''_k \text{ for } k=0, \ldots, K_\Pi - 1$$
$$w_{K_\Pi + 2k + 1} = v'''_k \text{ for } k=0, \ldots, K_\Pi - 1 \quad \text{[Equation 3]}$$

At the bit selection and pruning step (S1902) in FIG. 19, a rate matching output bit sequence $e_k$ is obtained from $w_k$. The number of bits of the rate matching output bit sequence $e_k$ is E. FIG. 20 is a diagram illustrating an example of the bit selection and pruning according to the present embodiment. In FIG. 20, $rv_{idx}$ represents a redundancy version (RV) number for transmission of the corresponding transport block. The RV number is indicated by information included in the DCI format. In FIG. 20, $N_{cb}$ represents a soft buffer size for the corresponding code block and expressed by the number of bits. $N_{cb}$ is provided by Equation (4) below.

$$N_{cb} = \min\left(\left\lfloor \frac{N_{IR}}{C} \right\rfloor, K_w\right) \quad \text{[Equation 4]}$$

Here, C represents the number of code blocks into which one transport block is segmented at the code block segmentation (S600) in FIG. 6. Here, $N_{IR}$ represents a soft buffer size for the corresponding transport block and expressed by the number of bits. $N_{IR}$ is provided by Equation (5) below.

$$N_{IR} = \left\lfloor \frac{N_{soft}}{K_C \cdot K_{MIMO} \cdot \min(M_{DL\_Harq}, M_{limit})} \right\rfloor \quad \text{[Equation 5]}$$

Here, in a case that the terminal device 1 is configured to receive the PDSCH transmission, based on transmission mode 3, 4, 8, 9, or 10, $K_{MIMO}$ is 2, and in other cases, $K_{MIMO}$ is 1. $K_{MIMO}$ is the same as the maximum number of transport blocks which can be included in one PDSCH transmission received based on the transmission mode configured for the terminal device 1.

Here, $M_{DL\_HARQ}$ represents a maximum number of downlink HARQ processes managed in parallel in the corresponding one serving cell. $M_{DL\_HARQ}$ may be 8 for a FDD serving cell. $M_{DL\_HARQ}$ may correspond to uplink-downlink configuration for a TDD serving cell. Here, $M_{limit}$ is 8.

Here, $K_c$ represents any one of {1, 3/2, 2, 3, and 5}. A method of configuring $K_c$ is described after describing a method of configuring $N_{soft}$.

Here, $N_{soft}$ represents the total number of soft channel bits according to the UE category or the downlink UE category. $N_{soft}$ is provided by any one of the capability parameter ue-Category (without suffix), the capability parameter ue-Category-v1020, the capability parameter ue-Category-v1170, and the capability parameter ue-CategoryDL-r12.

$N_{soft}$ may be specified based on (i) which of the capability parameter ue-Category (without suffix), the capability parameter ue-Category-v1020, the capability parameter ue-Category-v1170, and the capability parameter ue-CategoryDL-r12 is transmitted, (ii) whether the parameter Max-LayersMIMO-r10 is received/configured, and/or (iii) whether a parameter altCQI-Table-r12 is received/configured.

In a case that the parameter altCQI-Table-r12 is not configured for the terminal device 1, the terminal device 1 derives the CQI, based on a first table indicating a correspondence between the combination of the modulation scheme and the coding rate and the CQI for a single transport block transmitted on the PDSCH. In a case that the parameter altCQI-Table-r12 is configured for the terminal device 1, the terminal device 1 derives the CQI, based on a second table indicating a correspondence between the combination of the modulation scheme and the coding rate and the CQI for a single transport block transmitted on the PDSCH. The first table may be a table designed assuming that 256 QAM does not apply to the PDSCH. The second table may be a table designed assuming that 256 QAM applies to the PDSCH.

Figure 21:
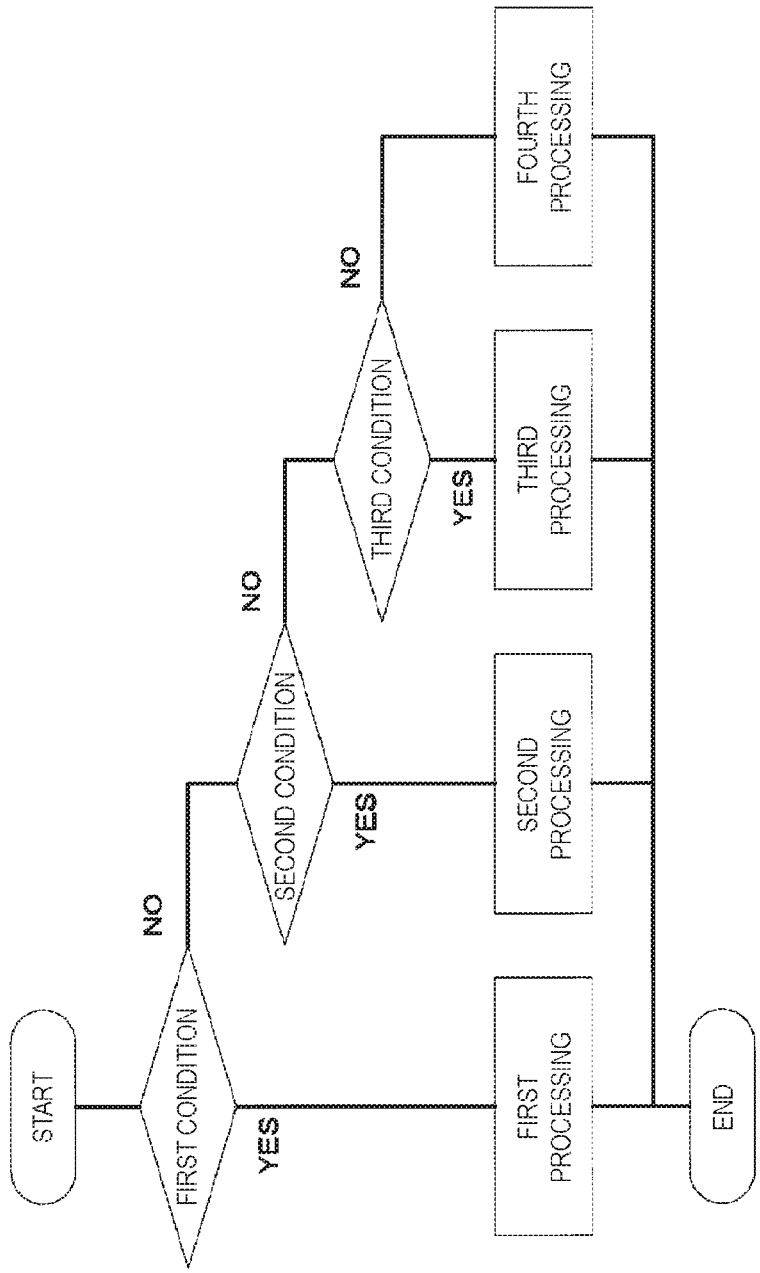
FIG. 21 is a diagram illustrating an example of a flowchart for determining a total number of soft channel bits $N_{soft}$ according to the present embodiment.

FIG. 21 is a diagram illustrating an example of a flowchart for determining the total number of soft channel bits, $N_{soft}$, according to the present embodiment. The flow in FIG. 21 may apply to each of the downlink component carriers (cells). In a case that a first condition is met, first processing is performed. In a case that the first condition is not met, the processing proceeds to a second condition. In a case that the second condition is met, second processing is performed. In a case that the second condition is not met, the processing proceeds to a third condition. In a case that the third condition is met, third processing is performed. In a case that the third condition is not met, fourth processing is performed. After the first processing, the second processing, the third processing, or the fourth processing, the flow for determining the total number of soft channel bits, $N_{soft}$, is terminated.

In the first condition in FIG. 21, (i) if the terminal device 1 signals the capability parameter ue-CategoryDL-r12 indicating downlink UE category 0, or (ii) if the terminal device 1 signals the capability parameter ue-CategoryDL-r12 not indicating downlink UE category 0 and the terminal device 1 is configured with the parameter altCQI-Table-r12 for the downlink component carrier (cell) by the higher layer (YES), $N_{soft}$ is the total number of soft channel bits according to the downlink UE category indicated by the capability parameter ue-CategoryDL-r12 (the first processing).

In the second condition in FIG. 21, if the terminal device 1 signals the capability parameter ue-Category-v11 a0 and the terminal device 1 is configured with the parameter altCQI-Table-r12 for the downlink component carrier (cell) by the higher layer (YES), $N_{soft}$ is the total number of soft channel bits according to the UE category indicated by the capability parameter ue-Category-v11a0 (the second processing).

In the third condition in FIG. 21, if the terminal device 1 signals the capability parameter ue-Category-v1020 and the terminal device 1 is configured with the first transmission mode (e.g., transmission 9 or transmission mode 10) for the downlink component carrier (cell) (YES), $N_{soft}$ is the total number of soft channel bits according to the UE category indicated by the capability parameter ue-Category-v1020 (the third processing). Here, the terminal device 1 may or may not signal the capability parameter ue-Category-v1170.

In the third condition in FIG. 21, if the terminal device 1 signals the capability parameter ue-Category-v1020 and the terminal device 1 is configured with the parameter MaxLayersMIMO-r10 for the downlink component carrier (cell) by the higher layer (YES), $N_{soft}$ is the total number of soft channel bits according to the UE category indicated by the capability parameter ue-Category-v1020 (the third processing). Here, the terminal device 1 may be configured with other transmission mode than the first transmission mode (e.g., transmission mode 3 or 4). Here, the terminal device 1 may or may not signal the capability parameter ue-Category-v1170.

If the first condition, the second condition, and the third condition in FIG. 21 are not met, $N_{soft}$ is the total number of soft channel bits according to the UE category indicated by the capability parameter ue-Category (without suffix) (the fourth processing). For example, if the terminal device 1 signals the capability parameter ue-Category-v11a0, the capability parameter ue-Category-v1120, the capability parameter ue-Category-v1020, and the capability parameter ue-Category (without suffix), the terminal device 1 is not configured with the parameter altCQI-Table-r12 for the downlink component carrier (cell) by the higher layer, the terminal device 1 is not configured with the parameter MaxLayersMIMO-r10 for the downlink component carrier (cell) by the higher layer, and the terminal device 1 is configured with a transmission mode other than the first transmission mode, $N_{soft}$ is the total number of soft channel bits according to the UE category indicated by the capability parameter ue-Category (without suffix). For example, if the terminal device 1 signals the capability parameter ue-Category-v1120, the capability parameter ue-Category-v1020, and the capability parameter ue-Category (without suffix), the terminal device 1 is not configured with the parameter MaxLayersMIMO-r10 for the downlink component carrier (cell) by the higher layer, and the terminal device 1 is configured with other transmission mode than the first transmission mode, $N_{soft}$ is the total number of soft channel bits according to the UE category indicated by the capability parameter ue-Category (without suffix).

FIG. 22 is a diagram illustrating an example of a method of configuring $K_c$ according to the present embodiment. Note that $K_c$ may be determined for each serving cell. $K_c$ is not determined for each CSI process or for each NZP CSI-RS resource. $K_c$ is provided, based on (i) $N_{soft}$ specified in FIG. 21, (ii) whether the terminal device 1 is configured with the parameter altCQI-Table-r12 for the downlink component carrier (cell) by the higher layer, and/or (iii) the maximum number of layers.

The maximum number of layers may be the maximum number of layers indicated by the parameter maxLayersMIMO-r10 or the parameter maxLayersMIMO-r11. The maximum number of layers may be a maximum of multiple maximum numbers of layers indicated by multiple parameters maxLayersMIMO-r11.

If the parameter maxLayersMIMO-r10 and the parameter maxLayersMIMO-r11 are not configured, the maximum number of layers may be (i) the number of layers supported by the transmission scheme of PDSCH corresponding to the transmission mode with which the terminal device 1 is configured for the downlink component carrier (cell).

Hereinafter, a description is given of a seventh example for a method of specifying the rate matching for a code block size of the transport block at step S1607 in FIG. 16. The seventh example applies to the terminal device 1.

(9-1) In a ninth example, the terminal device 1 includes the transmission unit 107 configured to transmit a Rank Indicator (RI) for Physical Downlink Shared CHannel (PDSCH) transmission, the reception unit 105 configured to receive first information (RRCConnectionReconfiguration message) used for determining a first maximum number of layers, the first maximum number being assumed for determining a bit width for the RI, and receive a transport block on the PDSCH, and the decoding unit 1051 configured to decode a code block of the transport block. Here, rate matching for the code block is based on at least a soft buffer size for the code block. Here, the soft buffer size for the code block is based on at least the first information (RRCConnectionReconfiguration message) used for determining the first maximum number of the layers.

(9-2) In the ninth example, the transmission unit 107 transmits the RI on a Physical Uplink Shared CHannel (PUSCH).

(9-3) In the ninth example, the terminal device 1 is configured with a first transmission mode for the PDSCH transmission (e.g., transmission mode 9 or transmission mode 10).

(9-4) In the ninth example, the transmission unit 107 transmits capability information (UECapabilityInformation) including second information (ue-Category (without suffix)) and third information (ue-Category-v1020). Here, the second information (ue-Category (without suffix)) indicates a second maximum number of the layers supported by the terminal device in a downlink, and a first UE category corresponding to a first total number of soft channel bits available for Hybrid Automatic Repeat reQuest (HARQ) processing in the downlink. Here, the third information (ue-Category-v1020) indicates a third maximum number of the layers supported by the terminal device in the downlink, and a second UE category corresponding to a second total number of soft channel bits available for the Hybrid Automatic Repeat reQuest (HARQ) processing in the downlink. Here, the soft buffer size for the code block is provided by referring to any one of the first total number and the second total number, based on whether the first information (RRCConnectionReconfiguration message) used for determining the first maximum number of the layers indicates a fourth maximum number of the layers.

(9-5) In the ninth example, in a case that the first information (RRCConnectionReconfiguration message) used for determining the first maximum number of the layers indicates the fourth maximum number of the layers, the soft buffer size for the code block is provided by referring to the first total number. Here, in a case that the first information (RRCConnectionReconfiguration message) used for determining the first maximum number of the layers does not indicate the fourth maximum number of the layers, the soft buffer size for the code block is provided by referring to the second total number. Here, "the first information (RRCConnectionReconfiguration message) does not indicate the fourth maximum number of the layers" includes that "the first information (RRCConnectionReconfiguration message) does not include the parameter MaxLayersMIMO-r10".

(9-6) In the ninth example, in the case that the first information (RRCConnectionReconfiguration message)

used for determining the first maximum number of the layers indicates the fourth maximum number of the layers, the first maximum number of the layers is provided by referring to the fourth maximum number of the layers. Here, that "the first information (RRCConnectionReconfiguration message) indicates the fourth maximum number of the layers" includes that "the parameter MaxLayersMIMO-r10 included in the first information (RRCConnectionReconfiguration message) indicates the fourth maximum number of the layers".

(9-7) In the seventh example, in the case that the first information (RRCConnectionReconfiguration message) used for determining the first maximum number of the layers does not indicate the fourth maximum number of the layers, the first maximum number of the layers is provided by referring to any one of multiple maximum numbers of the layers including at least the second maximum number of the layers and the third maximum number of the layers.

Hereinafter, a description is given of an eighth example for the method of specifying the rate matching for the code block size of the transport block at step S1607 in FIG. 16. A tenth example applies to the base station device 3.

(10-1) In the tenth example, the base station device 3 includes the reception unit 305 configured to receive a Rank Indicator (RI) for Physical Downlink Shared CHannel (PDSCH) transmission from a terminal device, the transmission unit 307 configured to transmit first information (RRCConnectionReconfiguration message) used by the terminal device for determining a first maximum number of layers to the terminal device, the first maximum number being assumed for determining a bit width for the RI by the terminal device, and transmit a transport block on the PDSCH to the terminal device, and the coding unit 3071 configured to code a code block of the transport block. Here, rate matching for the coded code block is based on at least a soft buffer size for the code block. Here, the soft buffer size for the coded code block is based on at least the first information (RRCConnectionReconfiguration message) used by the terminal device for determining the first maximum number of the layers.

(10-2) In the tenth example, the reception unit 305 receives the RI on a Physical Uplink Shared CHannel (PUSCH) from the terminal device.

(10-3) In the tenth example, the terminal device 1 is configured with a first transmission mode for the PDSCH transmission.

(10-4) In the tenth example, the reception unit 305 receives from the terminal device capability information (UECapabilityInformation) including second information (ue-Category (without suffix)) and third information (ue-Category-v1020). Here, the second information (ue-Category (without suffix)) indicates a second maximum number of the layers supported by the terminal device in a downlink, and a first UE category corresponding to a first total number of soft channel bits available for Hybrid Automatic Repeat reQuest (HARQ) processing in the downlink. Here, the third information (ue-Category-v1020) indicates a third maximum number of the layers supported by the terminal device in the downlink, and a second UE category corresponding to a second total number of soft channel bits available for the Hybrid Automatic Repeat reQuest (HARQ) processing in the downlink. Here, the soft buffer size for the code block is provided by referring to any one of the first total number and the second total number, based on whether the first information (RRCConnectionReconfiguration message) used by the terminal device for determining the first maximum number of the layers indicates a fourth maximum number of the layers.

(10-5) In the tenth example, in a case that the first information (RRCConnectionReconfiguration message) used by the terminal device for determining the first maximum number of the layers indicates the fourth maximum number of the layers, the soft buffer size for the code block is provided by referring to the first total number. Here, in a case that the first information (RRCConnectionReconfiguration message) used by the terminal device for determining the first maximum number of the layers does not indicate the fourth maximum number of the layers, the soft buffer size for the code block is provided by referring to the second total number.

(10-6) In the tenth example, in the case that the first information (RRCConnectionReconfiguration message) used by the terminal device for determining the first maximum number of the layers indicates the fourth maximum number of the layers, the first maximum number of the layers is provided by referring to the fourth maximum number of the layers.

(10-7) In the tenth example, in the case that the first information (RRCConnectionReconfiguration message) used by the terminal device for determining the first maximum number of the layers does not indicate the fourth maximum number of the layers, the first maximum number of the layers is provided by referring to any one of multiple maximum numbers of the layers including at least the second maximum number of the layers and the third maximum number of the layers.

Hereinafter, a description is given of an eleventh example of the method of specifying the bit width for the RI at step S1605 in FIG. 16 and the method of specifying the rate matching for the code block size of the transport block at step S1607 in FIG. 16. The eleventh example applies to the terminal device 1.

(11-1) In the eleventh example, the terminal device 1 includes the transmission unit 107 configured to transmit a first Rank Indicator (RI) for Physical Downlink Shared CHannel (PDSCH) transmission for a first Channel State Information (CSI) process for a first serving cell, and transmit a second RI for the PDSCH transmission for a second Channel State Information (CSI) process for the first serving cell, and the reception unit 105 configured to receive first information (MaxLayersMIMO-r11) used for determining a first maximum number of layers, the first maximum number being assumed for determining a bit width for the first RI, receive second information (MaxLayersMIMO-r11) used for determining a second maximum number of layers, the second maximum number being assumed for determining a bit width for the second RI, and receive a transport block on the PDSCH, and the decoding unit 1051 configured to decode a code block of the transport block, and rate matching for the code block is based on at least a soft buffer size for the code block, and the soft buffer size for the code block is based on at least a larger one of the first maximum number of the layers and the second maximum number of the layers.

(11-2) In the eleventh example, a second maximum number of the layers assumed for determining the bit width for the first RI is based on a smaller one of the first maximum number indicated by the first information and the number of CSI-RS ports for the first CSI process, and a third maximum number of the layers assumed for determining the bit width for the second RI is based on a smaller one of the second maximum number indicated by the second information and the number of CSI-RS ports for the second CSI process.

Hereinafter, a description is given of a twelfth example of the method of specifying the bit width for the RI at step S1605 in FIG. 16 and the method of specifying the rate matching for the code block size of the transport block at step S1607 in FIG. 16. The twelfth example applies to the base station device 3.

(12-1) In the twelfth example, the base station device 3 includes the reception unit 305 configured to receive a first Rank Indicator (RI) for Physical Downlink Shared CHannel (PDSCH) transmission for a first Channel State Information (CSI) process for a first serving cell, and receive a second RI for the PDSCH transmission for a second Channel State Information (CSI) process for the first serving cell, and the transmission unit 307 configured to transmit first information (MaxLayersMIMO-r11) used for determining a first maximum number of layers, the first maximum number being assumed for determining a bit width for the first RI, transmit second information (MaxLayersMIMO-r11) used for determining a second maximum number of layers, the second maximum number being assumed for determining a bit width for the second RI, and transmit a transport block on the PDSCH, and the coding unit 3071 configured to code a code block of the transport block, and rate matching for the code block is based on at least a soft buffer size for the code block, and the soft buffer size for the code block is based on at least a larger one of the first maximum number of the layers and the second maximum number of the layers.

(12-2) In the twelfth example, a second maximum number of the layers assumed for determining the bit width for the first RI is based on a smaller one of the first maximum number indicated by the first information and the number of CSI-RS ports for the first CSI process, and a third maximum number of the layers assumed for determining the bit width for the second RI is based on a smaller one of the second maximum number indicated by the second information and the number of CSI-RS ports for the second CSI process.

Hereinafter, a description is given of a thirteenth example of the method of specifying the bit width for the RI at step S1605 in FIG. 16 and the method of specifying the rate matching for the code block size of the transport block at step S1607 in FIG. 16. The thirteenth example applies to the terminal device 1.

(13-1) In the thirteenth example, the terminal device 1 includes the transmission unit 107 configured to transmit a first Rank Indicator (RI) for Physical Downlink Shared CHannel (PDSCH) transmission for a first Channel State Information (CSI) process for a first serving cell, and transmit a second RI for the PDSCH transmission for a second CSI process for the first serving cell, the reception unit 105 configured to receive first information (MaxLayersMIMO-r10) used for determining a first maximum number of layers, the first maximum number being assumed for determining bit widths for the first RI and the second RI, receive second information indicating the number of CSI-RS ports for the first CSI process, receive third information indicating the number of CSI-RS ports for the second CSI process, and receive a transport block on the PDSCH, and the decoding unit 1051 configured to decode a code block of the transport block, and rate matching for the code block is based on at least a soft buffer size for the code block, the soft buffer size for the code block is based on at least the first maximum number of the layers, a second maximum number of the layers assumed for determining the bit width for the first RI is based on a smaller one of the first maximum number indicated by the first information and the number of CSI-RS ports for the first CSI process, and a third maximum number of the layers assumed for determining the bit width for the second RI is based on a smaller one of the first maximum number indicated by the first information and the number of CSI-RS ports for the second CSI process.

Hereinafter, a description is given of a fourteenth example of the method of specifying the bit width for the RI at step S1605 in FIG. 16 and the method of specifying the rate matching for the code block size of the transport block at step S1607 in FIG. 16. The fourteenth example applies to the base station device 3.

(14-1) In the fourteenth example, the base station device 3 includes the reception unit 305 configured to receive a first Rank Indicator (RI) for Physical Downlink Shared CHannel (PDSCH) transmission for a first Channel State Information (CSI) process for a first serving cell, and receive a second RI for the PDSCH transmission for a second CSI process for the first serving cell, the transmission unit 307 configured to transmit first information (MaxLayersMIMO-r10) used for determining a first maximum number of layers, the first maximum number being assumed for determining bit widths for the first RI and the second RI, transmit second information indicating the number of CSI-RS ports for the first CSI process, transmit third information indicating the number of CSI-RS ports for the second CSI process, and transmit a transport block on the PDSCH, and the coding unit 3071 configured to code a code block of the transport block, and rate matching for the code block is based on at least a soft buffer size for the code block, the soft buffer size for the code block is based on at least the first maximum number of the layers, a second maximum number of the layers assumed for determining the bit width for the first RI is based on a smaller one of the first maximum number indicated by the first information and the number of CSI-RS ports for the first CSI process, and a third maximum number of the layers assumed for determining the bit width for the second RI is based on a smaller one of the first maximum number indicated by the first information and the number of CSI-RS ports for the second CSI process.

The soft channel bits for the code block of the transport block stored by the terminal device 1 at S1609 in FIG. 16 are based on the soft buffer size $N_{cb}$ for the code block of the transport block. In the case that the terminal device 1 fails to decode the code block of the transport block, the terminal device 1 at least corresponds to the range of $<w_k, w_{k+1}, \ldots w_{(k+nSB-1)mod\ Ncb}>$ and stores the received soft channel bits. In $<w_k, w_{k+1}, \ldots w_{(k+nSB-1)mod\ Ncb}>$, k is determined by the terminal device 1. Here, in determining k in $<w_k, w_{k+1}, \ldots w_{(k+nSB-1)mod\ Ncb}>$, the terminal device 1 preferably gives priority to storing the soft channel bits corresponding to a smaller value of k.

Figure 23:
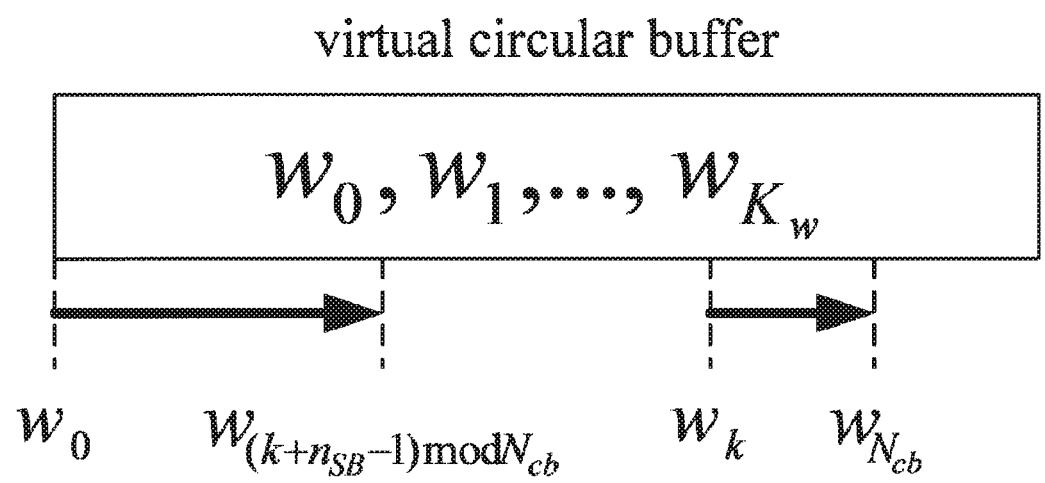
FIG. 23 is a diagram illustrating an example of a range of $<w_k, w_{k+1}, \ldots, w_{(k+nSB-1) mod\ Ncb}>$ according to the present embodiment.

FIG. 23 is a diagram illustrating an example of the range of $<w_k, w_{k+1}, \ldots, w_{(k+nSB-1)mod\ Ncb}>$ according to the present embodiment. Here, $n_{SB}$ is provided by referring to the soft buffer size $N_{cb}$ for the code block of the transport block. $n_{SB}$ is provided by Equation (6) below.

$$n_{SB} = \min\left(N_{cb}, \left\lfloor \frac{N'_{soft}}{C \cdot N_{DL\_cells} \cdot K_{MIMO} \cdot \min(M_{DL\_HARQ}, M_{limit})} \right\rfloor\right) \quad [\text{Equation 6}]$$

Here, C is defined by Equation (4). Here, $K_{MIMO}$, $M_{DL\_HARQ}$, and $M_{limit}$ are defined by Equation (5). Here, $N_{DL\_cells}$ represents the number of downlink component carriers (cells) configured for the terminal device 1. Here, $N'_{soft}$ represents the total number of soft channel bits according to the UE category or the downlink UE category. $N_{soft}$ is provided by any one of the capability parameter ue-Category (without suffix), the capability parameter ue-Category-v1020, the capability parameter ue-Category-v1170, and the capability parameter ue-CategoryDL-r12. Note that $N_{soft}$ and $N'_{soft}$ are individually defined.

Figure 24:
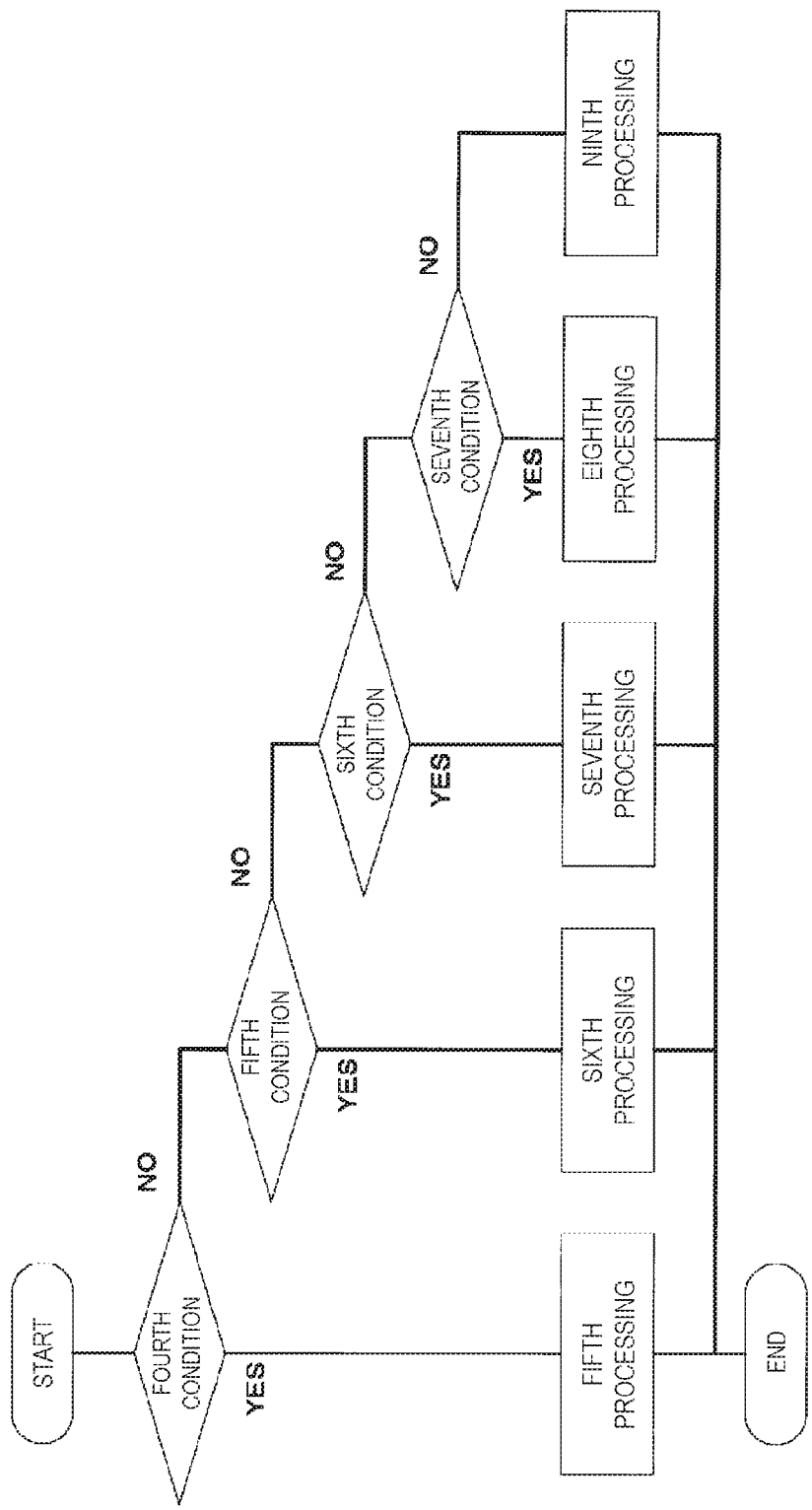
FIG. 24 is a diagram illustrating an example of a flowchart for determining a total number of soft channel bits $N'_{soft}$ according to the present embodiment.

FIG. 24 is a diagram illustrating an example of a flowchart for determining the total number of soft channel bits, $N'_{soft}$, according to the present embodiment. The flow in FIG. 24 may apply to each of the downlink component carriers (cells). In a case that a fourth condition is met, fifth processing is performed. In a case that the fourth condition is not met, the processing proceeds to a fifth condition. In a case that the fifth condition is met, sixth processing is performed. In a case that the fifth condition is not met, the processing proceeds to a six condition. In a case that the sixth condition is met, seventh processing is performed. In a case that the sixth condition is not met, the processing proceeds to a seventh condition. In a case that the seventh condition is met, eighth processing is performed. In a case that the seventh condition is not met, ninth processing is performed. After the fifth processing, the sixth processing, the seventh processing, the eighth processing, or the ninth processing, the flow for determining the total number of soft channel bits, $N_{soft}$, is terminated.

In the fourth condition in FIG. 24, if the terminal device 1 signals the capability parameter ue-CategoryDL-r12 (YES), $N_{soft}$ is the total number of soft channel bits according to the downlink UE category indicated by the capability parameter ue-CategoryDL-r12 (the fifth processing).

In the fifth condition in FIG. 24, if the terminal device 1 signals the capability parameter ue-Category-v11a0, and does not signal the capability parameter ue-CategoryDL-r12 (YES), $N_{soft}$ is the total number of soft channel bits according to the UE category indicated by the capability parameter ue-Category-v11a0 (the sixth processing).

In the sixth condition in FIG. 24, if the terminal device 1 signals the capability parameter ue-Category-v1170, and does not signal the capability parameter ue-Category-v11a0 and the capability parameter ue-CategoryDL-r12 (YES), $N_{soft}$ is the total number of soft channel bits according to the UE category indicated by the capability parameter ue-Category-v1170 (the seventh processing).

In the seventh condition in FIG. 24, if the terminal device 1 signals the capability parameter ue-Category-v1020, and does not signal the capability parameter ue-Category-v1170, the capability parameter ue-Category-v11a0, and the capability parameter ue-CategoryDL-r12 (YES), $N_{soft}$ is the total number of soft channel bits according to the UE category indicated by the capability parameter ue-Category-v1020 (the eighth processing).

In the seventh condition in FIG. 24, if the terminal device 1 signals the capability parameter ue-Category (without suffix), and does not signal the capability parameter ue-Category-v1020, the capability parameter ue-Category-v1170, the capability parameter ue-Category-v11a0, and the capability parameter ue-CategoryDL-r12 (NO), $N_{soft}$ is the total number of soft channel bits according to the UE category indicated by the capability parameter ue-Category (without suffix) (the ninth processing).

To be more specific, in the case that the terminal device 1 fails to decode the code block of the transport block, the soft channel bits stored by the terminal device 1 may be provided by referring to some or all of (i) to (v) below.

(i) Which of the capability parameter ue-Category (without suffix), the capability parameter ue-Category-v1020, the capability parameter ue-Category-v1170, and the capability parameter ue-CategoryDL-r12, is transmitted.

(ii) Whether the parameter MaxLayersMIMO-r10 for the downlink component carrier is received/configured.

(iii) Whether the parameter altCQI-Table-r12 for the downlink component carrier is received/configured.

(iv) The number of layers supported by the transmission scheme of PDSCH corresponding to the transmission mode with which the terminal device 1 is configured for the downlink component carrier.

(v) The maximum number of layers assumed for specifying the bit width for the RI.

Hereinafter, a description is given of a fifteenth example for a method of storing the soft channel bits for the code block size of the transport block at step S1609 in FIG. 16. The fifteenth example applies to the terminal device 1.

(15-1) In the fifteenth example, the terminal device 1 includes the transmission unit 107 configured to transmit a Rank Indicator (RI) for Physical Downlink Shared CHannel (PDSCH) transmission, the reception unit 105 configured to receive first information (RRCConnectionReconfiguration message) used for determining a first maximum number of layers, the first maximum number being assumed for determining a bit width for the RI, and receive a transport block on the PDSCH, and the decoding unit 1051 configured to decode a code block of the transport block. Here, in a case that the decoding unit 1051 fails to decode the code block, the decoding unit 1051 stores soft channel bits corresponding to a range including at least predetermined soft channel bits among soft channel bits for the code block. Here, the predetermined soft channel bits are based on a soft buffer size for the code block. Here, the soft buffer size for the code block is based on at least the first information (RRCConnectionReconfiguration message) used for determining the first maximum number of the layers.

(15-2) In the fifteenth example, the transmission unit 107 transmits the RI on a Physical Uplink Shared CHannel (PUSCH).

(15-3) In the fifteenth example, the terminal device 1 is configured with a first transmission mode for the PDSCH transmission.

(15-4) In the fifteenth example, the transmission unit 107 transmits capability information (UECapabilityInformation) including second information (ue-Category (without suffix)) and third information (ue-Category-v1020). Here, the second information (ue-Category (without suffix)) indicates a second maximum number of the layers supported by the terminal device in a downlink, and a first UE category corresponding to a first total number of soft channel bits available for Hybrid Automatic Repeat reQuest (HARQ) processing in the downlink. Here, the third information (ue-Category-v1020) indicates a third maximum number of the layers supported by the terminal device in the downlink, and a second UE category corresponding to a second total number of soft channel bits available for the Hybrid Automatic Repeat reQuest (HARQ) processing in the downlink. Here, the soft buffer size for the code block is provided by referring to any one of the first total number and the second total number, based on whether the first information (RRCConnectionReconfiguration message) used for determining the first maximum number of the layers indicates a fourth maximum number of the layers.

(15-5) In the fifteenth example, in a case that the first information (RRCConnectionReconfiguration message) used for determining the first maximum number of the layers indicates the fourth maximum number of the layers, the soft buffer size for the code block is provided by referring to the first total number. Here, in a case that the first information (RRCConnectionReconfiguration message) used for determining the first maximum number of the layers does not indicate the fourth maximum number of the layers, the soft buffer size for the code block is provided by referring to the second total number.

(15-6) In the fifteenth example, in the case that the first information (RRCConnectionReconfiguration message) used for determining the first maximum number of the layers indicates the fourth maximum number of the layers, the first maximum number of the layers is provided by referring to the fourth maximum number of the layers.

(15-7) In the fifteenth example, in the case that the first information (RRCConnectionReconfiguration message) used for determining the first maximum number of the layers does not indicate the fourth maximum number of the layers, the first maximum number of the layers is provided by referring to any one of multiple maximum numbers of the layers including at least the second maximum number of the layers and the third maximum number of the layers.

Hereinafter, a description is given of a sixteenth example of the bit width for an RI at step S1605 in FIG. 16 and the method of storing the soft channel bits for the code block size of the transport block at step S1609 in FIG. 16. The sixteenth example applies to the terminal device 1.

(16-1) In the sixteenth example, the terminal device 1 includes the transmission unit 107 configured to transmit a first Rank Indicator (RI) for Physical Downlink Shared CHannel (PDSCH) transmission for a first Channel State Information (CSI) process for a first serving cell, and transmit a second RI for the PDSCH transmission for a second Channel State Information (CSI) process for the first serving cell, the reception unit 105 configured to receive first information (MaxLayersMIMO-r11) used for determining a first maximum number of layers, the first maximum number being assumed for determining a bit width for the first RI, receive second information (MaxLayersMIMO-r11) used for determining a second maximum number of layers, the second maximum number being assumed for determining a bit width for the second RI, and receive a transport block on the PDSCH, and the decoding unit 1051 configured to decode a code block of the transport block, and in a case that the decoding unit 1051 fails to decode the code block, the decoding unit 1051 stores soft channel bits corresponding to a range including at least predetermined soft channel bits among soft channel bits for the code block, the predetermined soft channel bits are based on a soft buffer size for the code block, and the soft buffer size for the code block is based on at least a larger one of the first maximum number of the layers and the second maximum number of the layers.

(16-2) In the sixteenth example, a second maximum number of the layers assumed for determining the bit width for the first RI is based on a smaller one of the first maximum number indicated by the first information and the number of CSI-RS ports for the first CSI process, and a third maximum number of the layers assumed for determining the bit width for the second RI is based on a smaller one of the second maximum number indicated by the second information and the number of CSI-RS ports for the second CSI process.

Hereinafter, a description is given of a seventeenth example of the bit width for the RI at step S1605 in FIG. 16 and the method of storing the soft channel bits for the code block size of the transport block at step S1609 in FIG. 16. The seventeenth example applies to the terminal device 1.

(17-1) In the seventeenth example, the terminal device 1 includes the transmission unit 107 configured to transmit a first Rank Indicator (RI) for Physical Downlink Shared CHannel (PDSCH) transmission for a first Channel State Information (CSI) process for a first serving cell, and transmit a second RI for the PDSCH transmission for a second CSI process for the first serving cell, the reception unit 105 configured to receive first information (MaxLayersMIMO-r10) used for determining a first maximum number of layers, the first maximum number being assumed for determining bit widths for the first RI and the second RI, receive second information indicating the number of CSI-RS ports for the first CSI process, receive third information indicating the number of CSI-RS ports for the second CSI process, and receive a transport block on the PDSCH, and the decoding unit 1051 configured to decode a code block of the transport block, and in a case that the decoding unit 1051 fails to decode the code block, the decoding unit stores soft channel bits corresponding to a range including at least predetermined soft channel bits among soft channel bits for the code block, the predetermined soft channel bits are based on a soft buffer size for the code block, the soft buffer size for the code block is based on at least the first maximum number of the layers, a second maximum number of the layers assumed for determining the bit width for the first RI is based on a smaller one of the first maximum number indicated by the first information and the number of CSI-RS ports for the first CSI process, and a third maximum number of the layers assumed for determining the bit width for the second RI is based on a smaller one of the first maximum number indicated by the first information and the number of CSI-RS ports for the second CSI process.

One bandwidth class corresponds to the number of continuous component carriers, supported by the terminal device 1, in one band in a frequency domain. However, one bandwidth class cannot correspond to the number of non-continuous component carriers, supported by the terminal device 1, in the one band in the frequency domain. The number of non-continuous component carriers, supported by the terminal device 1, in one band in the frequency domain can be expressed by multiple bandwidth classes indicated by multiple parameters ca-BandwidthClassDL-r10 included in the same one parameter BandCombinationParameters-r10.

FIG. 25 is a diagram illustrating an example of the parameter BandCombinationParameters-r10 according to the present embodiment. The parameter BandCombinationParameters-r10 (P2500) in FIG. 25 includes two parameters BandParameters-r10 (P2510, P2520).

The parameter FreqBandIndicator (P2511) included in the parameter BandParameters-r10 (P2510) indicates a band X. To be more specific, the parameter BandParameters-r10 (P2510) corresponds to the band X. The parameter caBandwidthClassDL-r10 (P2512) included in the parameter BandParameters-r10 (P2510) indicates a bandwidth class A. To be more specific, the parameter BandParameters-r10 (P2510) corresponds to any one of the downlink component carriers included in the band X. The parameter supportedMIMO-CapabilityDL-r10 (P2513) included in the parameter BandParameters-r10 (P2510) indicates 4. To be more specific, the maximum number of layers in one downlink component carrier corresponding to the parameter ca-BandwidthClassDL-r10 (P2512) is 4. The parameter ca-BandwidthClassUL-r10 (P2514) included in the parameter BandParameters-r10 (P2510) indicates the bandwidth class A. To be more specific, the parameter BandParameters-r10 (P2510) corresponds to any one of the uplink component carriers included in the band X.

The parameter FreqBandIndicator (P2521) included in the parameter BandParameters-r10 (P2520) indicates the band X. To be more specific, the parameter BandParameters-r10 (P2520) corresponds to the band X. The parameter caBandwidthClassDL-r10 (P2522) included in the parameter BandParameters-r10 (P2520) indicates the bandwidth class A. To be more specific, the parameter BandParameters-r10 (P2520) corresponds to any one of the downlink component carriers included in the band X. The parameter supportedMIMO-CapabilityDL-r10 (P2523) included in the parameter BandParameters-r10 (P2520) indicates 2. To be more specific, the maximum number of layers in one downlink component carrier corresponding to the parameter ca-BandwidthClassDL-r10 (P2522) is 2. The parameter BandParameters-r10 (P2520) does not include the parameter bandParametersUL-r10. To be more specific, the parameter BandParameters-r10 (P2520) corresponds to a secondary cell(s) (downlink component carrier) not corresponding to the uplink component carrier (uplink resource). The primary cell necessarily corresponds to one downlink component carrier and one uplink component carrier. To be more specific, the primary cell necessarily includes the uplink component carrier (uplink resource).

The base station device 3 configures the primary cell and the secondary cell(s) in the band X for the terminal device 1 according to the received parameter BandCombinationParameters-r10 (P2500). Here, the downlink component carrier corresponding to the primary cell and the downlink component carrier corresponding to the secondary cell(s) may be discontinuous in the frequency domain. Here, the secondary cell(s) in the band X does not include the uplink component carrier (uplink resource).

In a case that the parameter BandCombinationParameters-r10 (P2500) is transmitted to the base station device 3, and the terminal device 1 is configured with the primary cell and the secondary cell(s) in the band X, the terminal device 1 and the base station device 3 consider that the fifth maximum number of the layers in the primary cell is provided by the parameter supportedMIMO-CapabilityDL-r10 (P2513) and the fifth maximum number of the layers in the secondary cell(s) is provided by the parameter supportedMIMO-CapabilityDL-r10 (P2523). Here, the secondary cell(s) in the band X does not include the uplink component carrier (uplink resource). To be more specific, depending on whether the serving cell in the band X is the primary cell or the secondary cell(s) not including the uplink component carrier (uplink resource), any one of the parameter supportedMIMO-CapabilityDL-r10 (P2513) and the parameter supportedMIMO-CapabilityDL-r10 (P2523) is selected, as a parameter for determining the fifth maximum number of the layers assumed for determining the bit width for the RI, by the base station device 3 and the terminal device.

Hereinafter, a description is given of an eighteenth example of the method of specifying the bit width for the RI at step S1605 in FIG. 16. The eighteenth example applies to the terminal device 1.

(18-1) In the eighteenth example, the terminal device 1 is a terminal device configured with multiple downlink component carriers, the multiple downlink component carriers being in a first band in a first band combination and including a first downlink component carrier. Here, the terminal device 1 includes the transmission unit 107 and the reception unit 105, the transmission unit 107 transmitting a Rank Indicator (RI), the RI corresponding to Physical Downlink Shared CHannel (PDSCH) transmission in the first downlink component carrier and corresponding to the number of layers, the RI being determined by the terminal device, the reception unit 105 receiving the PDSCH. Here, the transmission unit 107 transmits capability information including first information, second information, third information, fourth information, and/or fifth information. Here, the reception unit 105 receives sixth information for the first downlink component carrier. Here, the first information indicates a UE category corresponding to a first maximum number of the layers supported by the terminal device in a downlink. Here, the second information indicates a first bandwidth class for the first band in the first band combination, the first bandwidth class corresponding to the number of downlink component carriers supported by the terminal device. Here, the third information indicates a second bandwidth class for the first band in the first band combination, the second bandwidth class corresponding to the number of downlink component carriers supported by the terminal device. Here, the fourth information is applied to one or all of multiple downlink component carriers corresponding to the first bandwidth class of the first band in the first band combination, and indicates a second maximum number of the layers supported by the terminal device in the downlink. Here, the fifth information is applied to one or all of multiple downlink component carriers corresponding to the second bandwidth class of the first band in the first band combination, and indicates a third maximum number of the layers supported by the terminal device in the downlink. Here, the sixth information indicates a fourth maximum number of the layers. Here, a fifth maximum number of the layers assumed for determining the bit width for the RI is provided by referring to any one of the second maximum number of the layers and the third maximum number of the layers, based on whether the first downlink component carrier corresponds to the primary cell or the secondary cell(s).

Hereinafter, a description is given of a nineteenth example of the method of specifying the bit width for the RI at step S1605 in FIG. 16. The nineteenth example applies to the base station device 3.

(19-1) In the nineteenth example, the base station device 3 is a base station device communicating with a terminal device configured with multiple downlink component carriers, the multiple downlink component carriers being in a first band in a first band combination and including a first downlink component carrier. Here, the base station device 3 includes the reception unit 305 and the transmission unit 307, the reception unit 305 receiving a Rank Indicator (RI), the RI corresponding to Physical Downlink Shared CHannel (PDSCH) transmission in the first downlink component carrier and corresponding to the number of layers, the RI being determined by the terminal device, the transmission unit 307 transmitting the PDSCH. Here, the reception unit 305 receives capability information including first information, second information, third information, fourth information, and/or fifth information from the terminal device. Here, the transmission unit 307 transmits sixth information for the first downlink component carrier to the terminal device. Here, the first information indicates a UE category corresponding to a first maximum number of the layers supported by the terminal device in a downlink. Here, the second information indicates a first bandwidth class for the first band in the first band combination, the first bandwidth class corresponding to the number of downlink component carriers supported by the terminal device. Here, the third information indicates a second bandwidth class for the first band in the first band combination, the second bandwidth class corresponding to the number of downlink component carriers supported by the terminal device. Here, the fourth information is applied to one or all of multiple downlink component carriers corresponding to the first bandwidth class of the first band in the first band combination, and indicates a second maximum number of the layers supported by the terminal device in the downlink. Here, the fifth information is applied to one or all of multiple downlink component carriers corresponding to the second bandwidth class of the first band in the first band combination, and indicates a third maximum number of the layers supported by the terminal device in the downlink. Here, the sixth information indicates a fourth maximum number of the layers. Here, a fifth maximum number of the layers assumed for determining the bit width for the RI is provided by referring to any one of the second maximum number of the layers and the third maximum number of the layers, based on whether the first downlink component carrier corresponds to the primary cell or the secondary cell(s).

FIG. 26 is a diagram illustrating an example of the parameter BandCombinationParameters-r10 according to the present embodiment. The parameter BandCombinationParameters-r10 (P2600) in FIG. 26 includes two parameters BandParameters-r10 (P2510, P2620).

The parameter BandParameters-r10 (P2510) in FIG. 26 is the same in structure/value as the parameter BandParameters-r10 (P2510) in FIG. 25. A parameter bandEUTRA-r10 and the parameter bandParametersDL-r10 included in the parameter BandParameters-r10 (P2620) in FIG. 26 are the same in structure/value as the parameter bandEUTRA-r10 and the parameter bandParametersDL-r10 included in the parameter BandParameters-r10 (P2520) in FIG. 25, respectively. The parameter BandParameters-r10 (P2620) in FIG. 26 includes a parameter bandParametersUL-r10. The parameter ca-BandwidthClassDL-r10 (P2624) included in the parameter BandParameters-r10 (P2620) indicates the bandwidth class A. To be more specific, the parameter BandParameters-r10 (P2620) corresponds to any one of the uplink component carriers included in the band X.

The base station device 3 configures the primary cell and the secondary cell(s) in the band X for the terminal device 1 according to the received parameter BandCombinationParameters-r10 (P2600). Here, the downlink component carrier corresponding to the primary cell and the downlink component carrier corresponding to the secondary cell(s) may be discontinuous in the frequency domain. Here, the secondary cell(s) in the band X includes the uplink component carrier (uplink resource).

In a case that the parameter BandCombinationParameters-r10 (P2600) is transmitted to the base station device 3, and the terminal device 1 is configured with the primary cell and the secondary cell(s) in the band X, the terminal device 1 and the base station device 3 cannot determine by which of the parameter supportedMIMO-CapabilityDL-r10 (P2513) and the parameter supportedMIMO-CapabilityDL-r10 (P2523) the fifth maximum number of the layers in the primary cell is provided. Here, the secondary cell(s) in the band X includes the uplink component carrier (uplink resource).

In such a case, the base station device 3 preferably transmits the parameter MaxLayersMIMO-r10 for the primary cell and the parameter MaxLayersMIMO-r10 for the secondary cell(s) to the terminal device 1. Here, the terminal device 1 specifies the fifth maximum number of the layers assumed for determining the bit width for the RI for the primary cell by referring to the parameter MaxLayersMIMO-r10 for the primary cell, and specifies the fifth maximum number of the layers assumed for determining the bit width for the RI for the secondary cell(s) by referring to the parameter MaxLayersMIMO-r10 for the secondary cell(s). In a case that the terminal device 1 does not receive/is not configured with the parameter MaxLayersMIMO-r10 for the primary cell and the parameter MaxLayersMIMO-r10 for the secondary cell(s), the fifth maximum number of the layers assumed for determining the bit width for the RI for the primary cell and the fifth maximum number of the layers assumed for determining the bit width for the RI for the secondary cell(s) may be provided by the maximum number of layers corresponding to the capability parameter ue-Category (without suffix).

Hereinafter, a description is given of a twentieth example of the method of specifying the bit width for the RI at step S1605 in FIG. 16. The twentieth example applies to the terminal device 1.

(20-1) In the twentieth example, the terminal device 1 is a terminal device configured with multiple downlink component carriers, the multiple downlink component carriers being in a first band in a first band combination and including a first downlink component carrier. Here, the terminal device includes the transmission unit 107 and the reception unit 105, the transmission unit 107 transmitting a Rank Indicator (RI), the RI corresponding to Physical Downlink Shared CHannel (PDSCH) transmission in the first downlink component carrier and corresponding to the number of layers, the RI being determined by the terminal device, the reception unit 105 receiving the PDSCH. Here, the transmission unit 107 transmits capability information including first information, second information, third information, fourth information, and/or fifth information. Here, the reception unit 105 receives sixth information for the first downlink component carrier. Here, the first information indicates a UE category corresponding to a first maximum number of the layers supported by the terminal device in a downlink. Here, the second information indicates a first bandwidth class for the first band in the first band combination, the first bandwidth class corresponding to the number of downlink component carriers supported by the terminal device. Here, the third information indicates a second bandwidth class for the first band in the first band combination, the second bandwidth class corresponding to the number of downlink component carriers supported by the terminal device. Here, the fourth information is applied to one or all of multiple downlink component carriers corresponding to the first bandwidth class of the first band in the first band combination, and indicates a second maximum number of the layers supported by the terminal device in the downlink. Here, the fifth information is applied to one or all of multiple downlink component carriers corresponding to the second bandwidth class of the first band in the first band combination, and indicates a third maximum number of the layers supported by the terminal device in the downlink. Here, the sixth information indicates a fourth maximum number of the layers. Here, a fifth maximum number of the layers assumed for determining the bit width for the RI is provided by referring to any one of the first maximum number of the layers and the fourth maximum number of the layers, based on whether the sixth information for the first downlink component carrier is configured.

(20-2) In the twentieth example, in a case that the sixth information for the first downlink component carrier is not configured, the fifth maximum number of the layers assumed for determining the bit width for the RI is provided by referring to the first maximum number of the layers. Here, in a case that the sixth information for the first downlink component carrier is configured, the fifth maximum number of the layers assumed for determining the bit width for the RI is provided by referring to the fourth maximum number of the layers.

(20-3) In the twentieth example, the terminal device is configured with transmission mode 3 or transmission mode 4.

Hereinafter, a description is given of a twenty-first example of the method of specifying the bit width for the RI at step S1605 in FIG. 16. The twenty-first example applies to the base station device 3.

(21-1) In the twenty-first example, the base station device 3 is a base station device communicating with a terminal device configured with multiple downlink component carriers, the multiple downlink component carriers being in a first band in a first band combination and including a first downlink component carrier. Here, the base station device includes the reception unit 305 and the transmission unit 307, the reception unit 305 receiving a Rank Indicator (RI) from the terminal device, the RI corresponding to Physical Downlink Shared CHannel (PDSCH) transmission in the first downlink component carrier and corresponding to the number of layers, the RI being determined by the terminal device, the transmission unit 307 transmitting the PDSCH to the terminal device. Here, the reception unit 305 receives capability information including first information, second information, third information, fourth information, and/or fifth information. Here, the transmission unit 307 transmits sixth information for the first downlink component carrier. Here, the first information indicates a UE category corresponding to a first maximum number of the layers supported by the terminal device in a downlink. Here, the second information indicates a first bandwidth class for the first band in the first band combination, the first bandwidth class corresponding to the number of downlink component carriers supported by the terminal device. Here, the third information indicates a second bandwidth class for the first band in the first band combination, the second bandwidth class corresponding to the number of downlink component carriers supported by the terminal device. Here, the fourth information is applied to one or all of multiple downlink component carriers corresponding to the first bandwidth class of the first band in the first band combination, and indicates a second maximum number of the layers supported by the terminal device in the downlink. Here, the fifth information is applied to one or all of multiple downlink component carriers corresponding to the second bandwidth class of the first band in the first band combination, and indicates a third maximum number of the layers supported by the terminal device in the downlink. Here, the sixth information indicates a fourth maximum number of the layers. Here, a fifth maximum number of the layers assumed for determining the bit width for the RI is provided by referring to any one of the first maximum number of the layers and the fourth maximum number of the layers, based on whether the terminal device is configured with the sixth information for the first downlink component carrier.

(21-2) In the twenty-first example, in a case that the terminal device is not configured with the sixth information for the first downlink component carrier, the fifth maximum number of the layers assumed for determining the bit width for the RI is provided by referring to the first maximum number of the layers. Here, in a case that the terminal device is configured with the sixth information for the first downlink component carrier, the fifth maximum number of the layers assumed for determining the bit width for the RI is provided by referring to the fourth maximum number of the layers.

(21-3) In the twenty-first example, the terminal device is configured with transmission mode 3 or transmission mode 4.

The capability information (UECapabilityInformation) may indicate whether the maximum number of layers indicated by the parameter supportedMIMO-CapabilityDL-r10 is applied to transmission mode 3 and/or transmission mode 4. The capability information (UECapabilityInformation) may include a parameter X indicating that the maximum number of layers indicated by the parameter supportedMIMO-CapabilityDL-r10 is applicable to transmission mode 3 and/or transmission mode 4.

The capability information (UECapabilityInformation) may indicate whether the maximum number of layers indicated by the parameter intraBandContiguousCC-InfoList-r12 is applied to transmission mode 3 and/or transmission mode 4. The capability information (UECapabilityInformation) may include a parameter Y indicating that the maximum number of layers indicated by the parameter intraBandContiguousCC-InfoList-r12 is applicable to transmission mode 3 and/or transmission mode 4. The parameter Y may be the same as the parameter X, and may be different from the parameter X.

In a case that the parameter X is not included in the capability information (UECapabilityInformation), the fifth maximum number of the layers assumed for determining the bit width for the RI may be provided by the maximum number of layers corresponding to the capability parameter ue-Category (without suffix), with respect to transmission mode 3 and/or transmission mode 4.

In a case that the parameter Y is not included in the capability information (UECapabilityInformation), the fifth maximum number of the layers assumed for determining the bit width for the RI may be provided by the maximum number of layers corresponding to the capability parameter ue-Category (without suffix), with respect to transmission mode 3 and/or transmission mode 4.

In a case that the parameter X and the parameter Y are not included in the capability information (UECapabilityInformation), the fifth maximum number of the layers assumed for determining the bit width for the RI may be provided by the maximum number of layers corresponding to the capability parameter ue-Category (without suffix), with respect to transmission mode 3 and/or transmission mode 4.

The present embodiment is described in detail above with reference to the first example to the twenty-first example and FIG. 1 to FIG. 26, but various modifications are possible within the scope of the first example to the twenty-first example and FIG. 1 to FIG. 26, and technical means/methods that are made by suitably combining technical means/methods disclosed according to the different examples and the drawings are also included in the technical scope of the present invention.

With this configuration, the terminal device 1 can efficiently communicate with the base station device 3. Moreover, the base station device 3 can efficiently communicate with the terminal device 1.

A program running on each of the base station device 3 and the terminal device 1 according to the present invention may serve as a program that controls a Central Processing Unit (CPU) and the like (a program for causing a computer to operate) in such a manner as to enable the functionalities according to the above-described embodiment of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Moreover, the terminal device 1 and the base station device 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and in that case, a medium that retains the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiment is achieved as an aggregation (a device group) constituted of multiple devices. Devices constituting such a device group may be each equipped with some or all portions of each function or each functional block of the base station device 3 according to the above-described embodiment. The device group may include at least general functionalities or general functional blocks of the base station device 3. Furthermore, the terminal device 1 according to the above-described embodiments can also communicate with the base station device as the aggregation.

Furthermore, the base station device 3 according to the above-described embodiment may serve as an Evolved Universal Terrestrial Radio Access Network (EUTRAN). Furthermore, the base station device 3 according to the above-described embodiment may have some or all portions of the functionalities of a node higher than an eNodeB.

Furthermore, some or all portions of each of the terminal device 1 and the base station device 3 according to the above-described embodiment may be achieved as an LSI which is a typical integrated circuit or may be achieved as a chip set. The functional blocks of each of the terminal device 1 and the base station device 3 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case where with advances in semiconductor technology, a circuit integration technology with which an LSI is replaced appears, it is also possible to use an integrated circuit based on the technology.

Furthermore, according to the above-described embodiments, the terminal device is described as one example of a terminal device or a communication device, but the present invention is not limited to this, and can be applied to a fixed-type electronic apparatus installed indoors or outdoors, or a stationary-type electronic apparatus, for example, a terminal device or a communication device, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

DESCRIPTION OF REFERENCE NUMERALS 1 (1A, 1B, 1C) Terminal device
3 . . . Base station device
101 . . . Higher layer processing unit
103 . . . Control unit
105 . . . Reception unit
107 . . . Transmission unit
301 . . . Higher layer processing unit
303 . . . Control unit
305 . . . Reception unit
307 . . . Transmission unit
1011 . . . Radio resource control unit
1013 . . . Scheduling information interpretation unit
1015 . . . CSI report control unit
3011 . . . Radio resource control unit
3013 . . . Scheduling unit
3015 . . . CSI report control unit

The invention claimed is:

1. A terminal device comprising:
transmission circuitry configured to transmit a first Rank Indicator (RI) associated with a first CSI-RS resource in a first Channel State Information (CSI) process in a first downlink component carrier of a first bandwidth class of a first band in a first band combination and a second RI associated with a second CSI-RS resource in the first CSI process; and reception circuitry configured to receive a Physical Downlink Shared CHannel (PDSCH) in the first downlink component carrier, wherein each of the first RI and the second RI is an RI for PDSCH transmission in the first downlink component carrier, and corresponds to a quantity of useful layers, the transmission circuitry is configured to transmit capability information including first information and second information, the reception circuitry is configured to receive third information indicating a first maximum quantity of layers for the first downlink component carrier, the first information indicates the first bandwidth class corresponding to a quantity of contiguous downlink component carriers in the first band to be supported by the terminal device, the second information indicates second maximum quantities of layers supported by the terminal device, the second maximum quantities corresponding to respective ones of bandwidth classes of the first band, and the bandwidth classes including the first bandwidth class, in a case that the third information is configured, a third maximum quantity of layers assumed for determining a bit width for the first RI and a fourth maximum quantity of layers assumed for determining a bit width for the second RI are determined according to the third information, in a case that the third information is not configured, the third maximum quantity of layers assumed for determining the bit width for the first RI and the fourth maximum quantity of layers assumed for determining the bit width for the second RI are determined according to a smallest one of a first number and a second number, the first number is maximum of the second maximum quantities of the layers, and the second number is a largest one of a quantity of antenna ports of the first CSI-RS resource and a quantity of antenna ports of the second CSI-RS resource.

2. A base station device comprising:

reception circuitry configured to receive a first Rank Indicator (RI) associated with a first CSI-RS resource in a first Channel State Information (CSI) process in a first downlink component carrier of a first bandwidth class of a first band in a first band combination and a second RI associated with a second CSI-RS resource in the first CSI process; and transmission circuitry configured to transmit a Physical Downlink Shared CHannel (PDSCH) in the first downlink component carrier, wherein each of the first RI and the second RI is an RI for PDSCH transmission in the first downlink component carrier, and corresponds to a quantity of useful layers, the reception circuitry is configured to receive capability information including first information and second information, the transmission circuitry is configured to transmit third information indicating a first maximum quantity of layers for the first downlink component carrier, the first information indicates the first bandwidth class corresponding to a quantity of contiguous downlink component carriers in the first band to be supported by the terminal device, the second information indicates second maximum quantities of layers supported by the terminal device, the second maximum quantities corresponding to respective ones of bandwidth classes of the first band, and the bandwidth classes including the first bandwidth class, in a case that the third information is configured, a third maximum quantity of layers assumed for determining a bit width for the first RI and a fourth maximum quantity of layers assumed for determining a bit width for the second RI are determined according to the third information, in a case that the third information is not configured, the third maximum quantity of layers assumed for determining the bit width for the first RI and the fourth maximum quantity of layers assumed for determining the bit width for the second RI are determined according to a smallest one of a first number and a second number, the first number is maximum of the second maximum quantities of the layers, and the second number is a largest one of a quantity of antenna ports of the first CSI-RS resource and a quantity of antenna ports of the second CSI-RS resource.

3. A communication method to be used by a terminal device, the communication method comprising:

transmitting a first Rank Indicator (RI) associated with a first CSI-RS resource in a first Channel State Information (CSI) process in a first downlink component carrier of a first bandwidth class of a first band in a first band combination and a second RI associated with a second CSI-RS resource in the first CSI process;

receiving a Physical Downlink Shared CHannel (PDSCH) in the first downlink component carrier, wherein each of the first RI and the second RI is an RI for PDSCH transmission in the first downlink component carrier, and corresponds to a quantity of useful layers;

transmitting capability information including first information and second information; and receiving third information indicating a first maximum quantity of layers for the first downlink component carrier, wherein the first information indicates the first bandwidth class corresponding to a quantity of contiguous downlink component carriers in the first band to be supported by the terminal device, the second information indicates second maximum quantities of layers supported by the terminal device, the second maximum quantities corresponding to respective ones of bandwidth classes of the first band, and the bandwidth classes including the first bandwidth class, in a case that the third information is configured, a third maximum quantity of layers assumed for determining a bit width for the first RI and a fourth maximum quantity of layers assumed for determining a bit width for the second RI are determined according to the third information, in a case that the third information is not configured, the third maximum quantity of layers assumed for determining the bit width for the first RI and the fourth maximum quantity of layers assumed for determining the bit width for the second RI are determined according to a smallest one of a first number and a second number, the first number is maximum of the second maximum quantities of the layers, and the second number is a largest one of a quantity of antenna ports of the first CSI-RS resource and a quantity of antenna ports of the second CSI-RS resource.

4. A communication method to be used by a base station device, the communication method comprising:

receiving a first Rank Indicator (RI) associated with a first CSI-RS resource in a first Channel State Information (CSI) process in a first downlink component carrier of a first bandwidth class of a first band in a first band combination and a second RI associated with a second CSI-RS resource in the first CSI process;

transmitting a Physical Downlink Shared CHannel (PDSCH) in the first downlink component carrier, wherein each of the first RI and the second RI is an RI for PDSCH transmission in the first downlink component carrier, and corresponds to a quantity of useful layers;

receiving capability information including first information and second information; and transmitting third information indicating a first maximum quantity of layers for the first downlink component carrier, wherein the first information indicates the first bandwidth class corresponding to a quantity of contiguous downlink component carriers in the first band to be supported by the terminal device, the second information indicates second maximum quantities of layers supported by the terminal device, the second maximum quantities corresponding to respective ones of bandwidth classes of the first band, and the bandwidth classes including the first bandwidth class, in a case that the third information is configured, a third maximum quantity of layers assumed for determining a bit width for the first RI and a fourth maximum quantity of layers assumed for determining a bit width for the second RI are determined according to the third information, in a case that the third information is not configured, the third maximum quantity of layers assumed for determining the bit width for the first RI and the fourth maximum quantity of layers assumed for determining the bit width for the second RI are determined according to a smallest one of a first number and a second number, the first number is maximum of the second maximum quantities of the layers, and the second number is a largest one of a quantity of antenna ports of the first CSI-RS resource and a quantity of antenna ports of the second CSI-RS resource.

* * * * *